United States Patent
Sutelan

(12) 
(10) Patent No.: US 6,412,243 B1
(45) Date of Patent: Jul. 2, 2002

(54) ULTRA-LITE MODULAR COMPOSITE BUILDING SYSTEM

(76) Inventor: Franklin S. Sutelan, 114A Fifty-Third St., Virginia Beach, VA (US) 23451

( * ) Notice: Subject to any disclaimer, the term of this patent is extended or adjusted under 35 U.S.C. 154(b) by 0 days.

(21) Appl. No.: 09/118,516

(22) Filed: Jul. 17, 1998

Related U.S. Application Data

(63) Continuation-in-part of application No. 08/841,356, filed on Apr. 30, 1997, now Pat. No. 6,205,728.

(51) Int. Cl.⁷ .............................................. E04C 2/292
(52) U.S. Cl. .................. 52/309.7; 52/588.1; 52/783.17; 52/798.1; 52/439; 52/726.1; 428/182
(58) Field of Search ............................ 52/309.4, 309.7, 52/309.15, 309.16, 588.1, 783.17, 783.18, 726.2, 726.4, 798.1, 505, 580, 438, 439; 428/116, 182, 309.9

(56) References Cited

U.S. PATENT DOCUMENTS

| | | | |
|---|---|---|---|
| 1,659,539 A | * 2/1928 | Judson ................. 52/783.19 X |
| 2,744,042 A | 5/1956 | Pace ............................ 154/75 |
| 3,159,514 A | 12/1964 | McKnight, Jr. et al. ...... 156/79 |
| 3,246,058 A | 4/1966 | Voelker ........................ 264/47 |
| 3,249,659 A | 5/1966 | Voelker ........................ 264/47 |
| 3,382,302 A | 5/1968 | Marzoochi ................... 264/45 |
| 3,526,556 A | 9/1970 | Berner ........................ 156/79 |
| 3,542,636 A | 11/1970 | Wandel ....................... 161/114 |
| 3,560,285 A | 2/1971 | Schroter et al. .............. 156/79 |
| 3,583,123 A | 6/1971 | Holmgren et al. ............ 52/584 |
| 3,650,871 A | 3/1972 | Bentfors ...................... 156/269 |
| 3,679,529 A | 7/1972 | Prusinski et al. ............. 161/44 |
| 3,731,449 A | 5/1973 | Kephart, Jr. .................. 52/631 |
| 3,741,857 A | 6/1973 | Kakutani et al. ........... 161/127 |
| 3,792,141 A | 2/1974 | Offutt .......................... 264/47 |
| 3,828,502 A | * 8/1974 | Carlsson ................... 52/580 X |
| 3,830,886 A | 8/1974 | Davis et al. ................. 260/953 |
| 3,908,324 A | * 9/1975 | Stout ........................... 52/607 |
| 3,950,910 A | 4/1976 | Pobanz ........................ 52/618 |
| 3,960,999 A | 6/1976 | Massie ....................... 264/45.3 |
| 4,038,798 A | * 8/1977 | Sachs ......................... 52/309.7 |
| 4,104,842 A | 8/1978 | Rockstead et al. ............ 52/650 |
| 4,147,582 A | 4/1979 | Brollo ........................ 156/462 |
| 4,159,681 A | 7/1979 | Vandament ................ 108/51.1 |
| 4,188,253 A | 2/1980 | Swarz ......................... 156/361 |
| 4,206,267 A | 6/1980 | Jungbluth ................... 428/623 |
| 4,241,555 A | 12/1980 | Dickens et al. ............... 52/454 |
| 4,327,142 A | 4/1982 | Norzi ......................... 428/198 |

(List continued on next page.)

FOREIGN PATENT DOCUMENTS

GB  1 499 168  1/1978

Primary Examiner—Carl D. Friedman
Assistant Examiner—Winnie Yip
(74) Attorney, Agent, or Firm—Bradford Kile; Kile Goekjian Lerner & Reed PLLC

(57) ABSTRACT

An ultra-lite modular composite building assembly system, comprising the lamination of rigid solid and expanded matrix materials, that can produce a functionally homogeneous composite structure capable of supporting over three hundred times its own weight. The rigid material, as the primary structure capable of sustained axial stress, is encapsulated within the body of the matrix material as a sheet or membrane that is bonded to and laterally braced by the matrix material. As a corrugated sheet or membrane, it may be either thermoformed or extruded and integrated into the body of the matrix composite in either a static or continuous foam molding process. The rigid material may be a solid polymer and the matrix material may be either an expanded polymer or any other structural foam matrix with similar characteristics. Further, extremities of the rigid material may be configured for tools-free interlock with adjacent building components. The resulting composite can generate economical structural components, the majority of which by volume is air, and thus create ultra-lite systems of assembly which generate great economies of mass-production and field installation.

31 Claims, 21 Drawing Sheets

U.S. PATENT DOCUMENTS

| | | | |
|---|---|---|---|
| 4,341,831 A | 7/1982 | Kleiss | 428/188 |
| 4,351,870 A | 9/1982 | English, Jr. | 428/174 |
| 4,461,130 A * | 7/1984 | Shubow | 52/236.8 |
| 4,558,550 A | 12/1985 | Marchais et al. | 52/309.7 |
| 4,611,450 A | 9/1986 | Chen | 52/309.4 |
| 4,740,256 A | 4/1988 | Vosberg | 156/73.1 |
| 4,774,794 A | 10/1988 | Grieb | 52/309.7 |
| 4,831,699 A | 5/1989 | Rozzi | 29/155 R |
| 4,856,244 A | 8/1989 | Clapp | 52/309.7 |
| 4,897,146 A | 1/1990 | Inzinna | 156/462 |
| 4,903,446 A | 2/1990 | Richards et al. | 52/223 R |
| 5,206,088 A | 4/1993 | Raevsky | 428/413 |
| 5,288,538 A | 2/1994 | Spears | 428/116 |
| 5,360,500 A * | 11/1994 | Evans et al. | 156/74 |
| 5,404,685 A | 4/1995 | Collins | 52/309.7 |
| 5,404,687 A | 4/1995 | Blake et al. | 52/600 |
| 5,448,862 A | 9/1995 | Candiracci | 52/182 |
| 5,519,973 A | 5/1996 | Keith et al. | 52/410 |
| 5,552,207 A | 9/1996 | Porter et al. | 428/109 |
| 5,566,517 A * | 10/1996 | Ishii et al. | 52/309.12 X |
| 5,606,832 A | 3/1997 | Keith et al. | 52/410 |
| 5,638,651 A | 6/1997 | Ford | 52/309.7 |
| 5,660,907 A | 8/1997 | Shalka | 428/67 |
| 5,664,382 A | 9/1997 | Melnick et al. | 52/425 |
| 5,792,552 A * | 8/1998 | Langkamp et al. | 428/309.9 |
| 6,164,035 A * | 12/2000 | Robers | 52/563 |

* cited by examiner

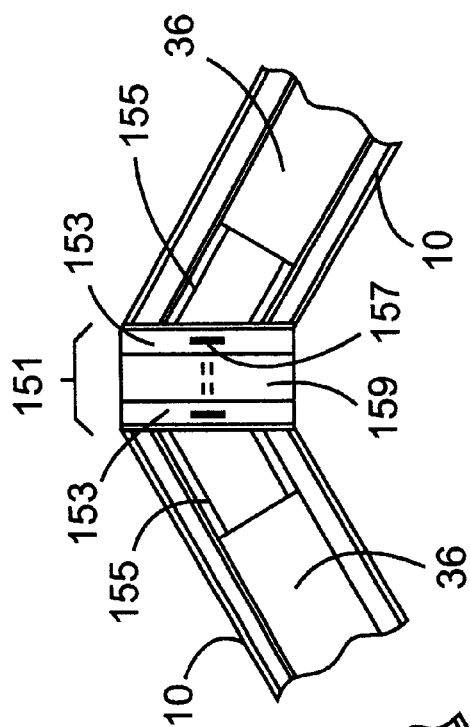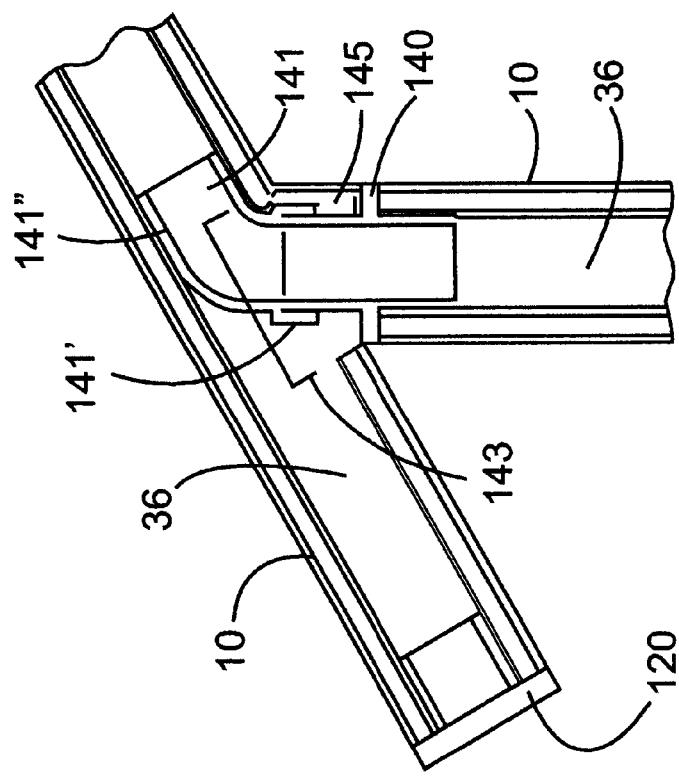

ULTRA-LITE MODULAR COMPOSITE BUILDING SYSTEM

CROSS-REFERENCE TO RELATED APPLICATION

This application is a continuation-in-part of application Ser. No. 08/841,356, filed Apr. 30, 1997, now U.S. Pat. No. 6,205,728 which is hereby incorporated by reference in its entirety.

BACKGROUND OF THE INVENTION

1. Field of the Invention

The invention provides a lightweight modular composite building assembly system with components capable of sustaining heavy axially applied loads.

2. Description of the Related Art

Polymer foam materials, e.g., sheets or blocks of low density expanded polystyrene, polyurethane and the like, have been widely used in the construction industry for purposes of building insulation. Plastic foam in the form of panels or foamed-in-place polyurethane has been used, for example, to provide an insulative wall or roof sheathing material, as perimeter insulation for floor slabs, as an insulative core layer sandwiched between structural components such as plywood, wall board or metal, as disclosed in U.S. Pat. No. 3,583,123, or as insulative layers surrounding poured concrete, as for example disclosed in U.S. Pat. No. 5,664,382.

It has also been proposed in the prior art to utilize plastic foam materials in combination with other structural components to prepare structural building panels or blocks which are said to be capable of structural rigidity especially from lateral loads or other stresses applied to them. Examples of such structural components may be found in U.S. Pat. No. 5,638,651 which discloses an interlocking insulated panel having an expanded polystyrene core sandwiched and glued between oriented strand board (OSB) and further containing a pair of metal channels glued to opposite sides of the core and partially embedded in the core. The metal channels are said to impart structural strength to the panel. U.S. Pat. No. 4,903,446 discloses a prestressed plastic foam structural member prepared by forming a grid-work of rope-like or wire tendons maintained in a tension condition within a mold, and encapsulating the grid-work with expandable plastic foam to form a lightweight structural member.

Also, U.S. Pat. No. 4,351,870 discloses a building panel material comprising a centrally disposed convoluted sheet stiffening layer of high strength material, such as metal or plastic, laminated on each side with an adhered sheet of expanded plastic material such that the expanded plastic sheet contacts the convoluted crests and troughs of the centrally disposed sheet. The panel may also contain coatings on the outer foamed plastic surfaces thereof which are of a decorative or weather-proofing nature, as well as combustion-inhibiting layers positioned on one or both sides of one or both expanded plastic sheet layers.

Further, U.S. Pat. No. 5,448,862 discloses a prefabricated foamed plastic staircase where vertical slots are provided for the insertion of reinforcing steel rods meant for embedment in concrete beams below the surface to provide stiffening for the overall structure but no assistance to the function loading on the tread surfaces.

Other related structures are disclosed in U.S. Pat. Nos. 4,159,681; 4,241,555; 4,558,550; 4,611,450; and 4,774,794.

In applications such as described above, the expanded plastic material serves two primary roles:
a) an insulation layer which imparts both insulative value and moisture barrier properties to the structure, and/or
b) a matrix imparting three-dimensional shape to the structure and providing a platform for mounting or assembling structural components and/or fire retardant or finishing layers.

In none of these applications are the main structural components intended for the primary purpose of supporting or bracing axial loads directly applied to an encapsulated rigid structure, nor is the expanded plastic material by itself intended to, or capable of, supporting high compressive or axial loads applied thereto, or even capable of contributing significantly to the strength of the main structural components which are designed into such systems as the load and stress-bearing components. It is obvious that, in all of the prior art, the general intent of the foam is to provide diaphragm rigidity to a planar configuration from lateral forces, with no active purpose in the support of directly applied longitudinal axial loading in compression. And while such diaphragm rigidity may have been accomplished, the end product results are limited to purposes of rigid building enclosure rather than as the main building structural supporting elements.

For example, consider a steel wire mounted vertically between the plates of a press. The wire will initially resist a certain amount of compressive axial force applied. As more pressure is applied, the wire will strain and begin to buckle and eventually bend or break at the point of compressive tensile failure. Now consider the wire inserted longitudinally at the axis of a cylinder of STYROFOAM™ plastic about the size of a wooden thread spool such that the wire tips are exposed at the base and top of the cylinder. As the main support for the structure, the axially disposed wire will be subjected to the same forces as described for the unsupported wire, but will to some degree be laterally supported by the STYROFOAM™ matrix. Since the styrene foam can support only about 20–25 lbs per square inch compressive force after 10% deformation, the wire remains the main structural component. The tendency of the wire to buckle is, however, somewhat restrained by forces generated as the wire bows and compresses the surrounding foam in the direction of bowing, but there is no support for the wire on the side opposite the direction of bowing and the wire will eventually rupture the compressed foam and fail as described above. This is essentially the same phenomena involved with the prior art structures described above where structural layers are laminated to or encapsulated within foam layers and the resulting structure subjected to stress.

Now consider that same steel wire coated with an adhesive and inserted longitudinally at the axis of the STYROFOAM™ cylinder such that the wire tips are exposed at the base and top of the cylinder and the shaft is circumferentially bonded to the foam. As the main support for the structure, the axially disposed wire will be subjected to the same forces as described for the unbonded wire, but the tendency of the wire to buckle is now restrained by foam matrix compressive resistance on the bowing side, and tensile forces on the opposite side between wire and foam because of the adhesive. Also, the circumferentially bonded adhesive on the wire itself will resist elongation and contraction of the wire's surface to provide additional stiffening and stability, further resisting the wire's tendency to buckle under compressive axial load.

It is therefore an object of the present invention to utilize the foam matrix itself, in combination with an adhesion to a fully encapsulated rigid sheet or membrane, for the prime purpose of laterally bracing said membrane to support high compressive axial load with minimum material expenditure. By volume, in the present invention the system is 88½% air, by which is created a structural matrix that laterally braces an axial-loaded membrane to produce ultimate strength. Therein, structural performance is maximized with minimum material.

It is a further object of the present invention to provide a high strength but extremely light weight axial load-bearing structural foamcore panel, where the strength to weight ratio can exceed 1000 to 1.

Another object of the present invention is to provide structural load-bearing wall panels wherein the encapsulated rigid sheet or membrane structure is in the form of longitudinally corrugated sheets with hollow tubular sections which are continuous across the entire dimension of the panels and establish a functionally homogeneous composite structure.

Yet another object of the present invention is to provide pairs of said corrugated sheets which, when reversed and mated together, form hollow tubular sections with perforated surfaces for the aspiration of process gases, the additional structural resistance against buckling, and the eventual installation of utilities related to panel erection in building construction.

Another object of the present invention is to provide this same wall panel configuration in the horizontal or oblique application to resist laterally applied loads, wherein a panel configuration similar to a wall panel may be used as roof panels or the like.

Still another object of the present invention is to provide filler floor beams which may be longitudinally subdivided sections of said wall or roof panel configurations with the longitudinal tubular sections horizontal and vertically aligned.

And another object of the present invention is to provide floor beams comprising a continuous longitudinal rigid hollow tubular section encapsulated in a rectangular volume of foam with a square cross-section, with three vertical sheet or membrane plates attached to the tube, with two at respectively opposite side tangent points and the third bisecting the hollow tube and projecting above and below it, with all such plates continuous and the full height of the rectangular volume composite.

And yet another object of the present invention is to provide a premolded staircase with successive and continuous rigid sheet or membrane stair profile stringers, made of a high-strength material, divided by, laminated to, and laterally braced by larger thicknesses of foamcore material such that the end result is a completed ultra-lightweight staircase assembly.

SUMMARY OF THE INVENTION

The above and other objects of the present invention and the attendant advantages are accomplished by maximizing the efficiency of a primary structural material. In the present invention, an axially-loaded sheet or membrane at 65 lb density can resist buckling by being laterally braced against failure with a structural foam matrix at 1.5 lb density. The resulting composite is extremely lightweight and economical, two highly desirable features for building construction components. In principle, the total encapsulation and adhesion of a rigid columnar material by a structural matrix which by volume is largely air produces this phenomenon. As opposed to the prior art where rigid stressed-skin structures are external only, herein the total encapsulation is internal and doubles the surface contact area for the beneficial lateral bracing effect. The theoretical advantage relative to the prior art is that this bracing effect will make the skin twice as strong or facilitate only half as much material to support the same weight under axial loading conditions. This advantage over the prior art implies an unprecedented potential for architectural expression in building formations, and establishes the basis for the embodiments of the present invention.

In accordance with the major embodiment of the present invention, an elongated rigid sheet or membrane, as the primary supporting structure capable of sustained axial stress, is encapsulated within, bonded to, and laterally braced by a foam core material to create a lightweight modular composite building frame component, wherein extremities of the rigid sheet or membrane may be configured on said frame component edges for tools-free interlock with adjacent horizontally and/or vertically aligned building components.

In accordance with another embodiment of the present invention, a floor system is provided comprising two connectors and a floor beam connected between the two connectors. The floor beam comprises a rigid hollow tube encased by an expanded polymer foam with openings into opposite ends of the tube. This hollow tube has three vertical plates attached, two at respectively opposite side tangent points and the third bisecting the tube and projecting above and below it, with all such plates continuous to the extremities of the polymer foam volume. The two connectors each have a pipe-shaped lateral extension that extends into opposite end openings of the tube thereby supporting the floor beam on the connectors.

In accordance with another method of the present invention, a method of manufacturing a wall panel is provided comprising rigid material which is shaped such that longitudinal tubular sections are formed along the entire length of the wall panel. These tubular sections are intended to do the following: they constitute the axial-loaded structure, the circular surfaces are perforated to form breathing vents for the aspiration of process gases generated in the molding process, and after panel erection these tubular sections establish a continual internal chase opportunity for the installation of utilities. The overall composite wall panel configuration is also used as a roof panel except longer continuous lengths are required than those normally associated with wall heights. Here, the loading is applied lateral or oblique to the main panel longitudinal axis, as well as that of the individual panel sheets, however the bracing action of the foam layer and the geometry of the panel configuration is sufficient to resist such lateral loads.

In accordance with yet another method of the present invention, a pre-molded laminate composite staircase configuration comprising continuous and successive rigid sheet or membrane stair profile stringers with continuous thin gage steel bands laminated thereto, divided by and laminated to larger continuous thicknesses of foam core material of the same stringer profile such that the end result is a completed laminate composite assembly which can function as a prefabricated structural staircase that is extremely lightweight, economical and easy to install.

BRIEF DESCRIPTION OF THE DRAWINGS

The foregoing aspects and other features of the present invention are explained in the following description, taken in connection with the accompanying drawings, wherein:

FIG. 10A is a vertical cross-section view of an alternate two-piece roof ridge connector, cut through dowel and corrugated sheet hollow tubular section center lines, connecting two roof panels to it;

FIG. 10B is a vertical cross-section view of the junction between a wall and roof panel, cut through dowel and corrugated sheet hollow tubular section center lines;

DETAILED DESCRIPTION OF THE PREFERRED EMBODIMENT

Figure 1:
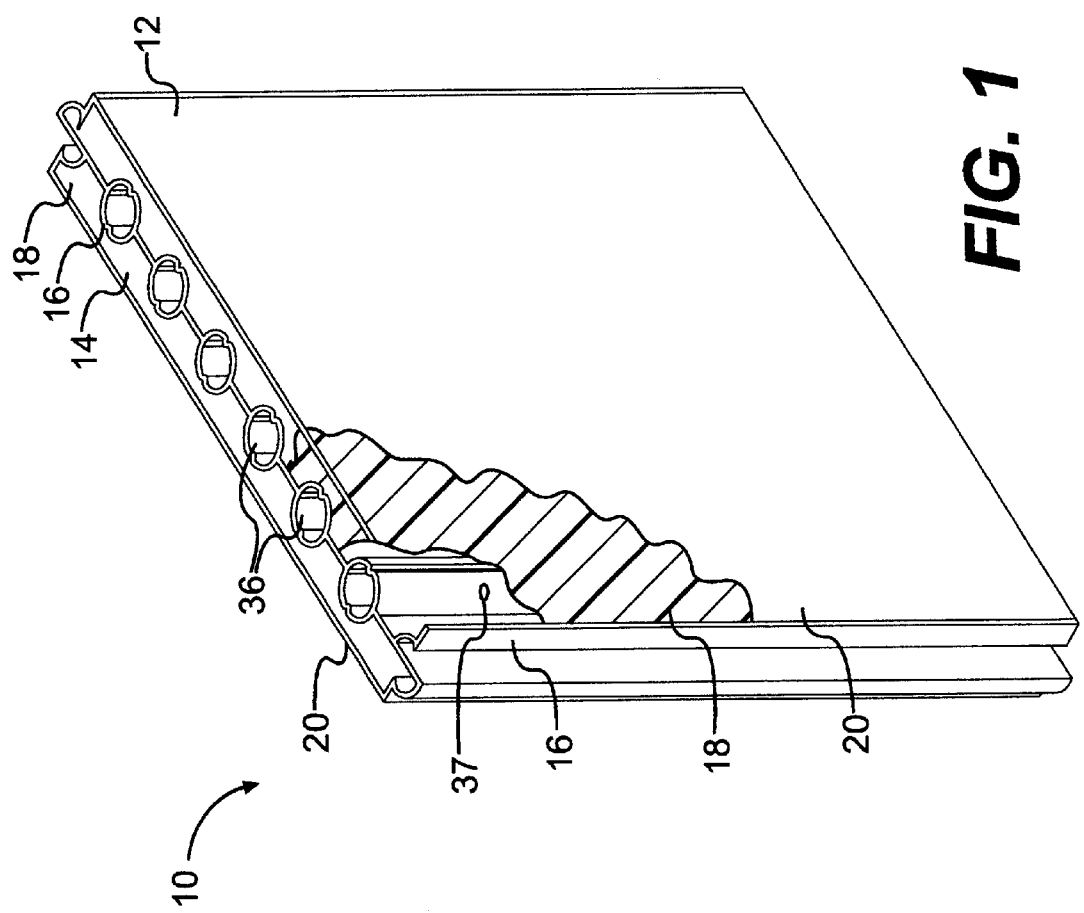
FIG. 1 is a perspective view with a cut away section of a wall panel incorporating features of the present invention.

Referring to FIG. 1, there is shown a perspective view with a cut away section of a wall panel 10 incorporating features of the present invention. Although the present invention will be described with reference to the embodiments shown in the drawings, it may be embodied in many alternative forms. In addition, any suitable size, shape or type of elements or materials could be used.

The panel 10 comprises two wall panel sections 12, 14 fixedly connected to each other. However the panel 10 could be fabricated as a single unit without separate sections. In this embodiment the two wall panel sections 12, 14 are substantially the same, but reversely orientated to each other and bonded together. Each panel section 12, 14 generally comprise a structural member 16, a lateral structurally reinforcing foam layer 18, and a cover layer 20. However, the pair of structural members 16 could be made as a single monolithic extrusion and integrated with foam layers 18 and cover layers 20 in a unitary molding process.

Figure 2:
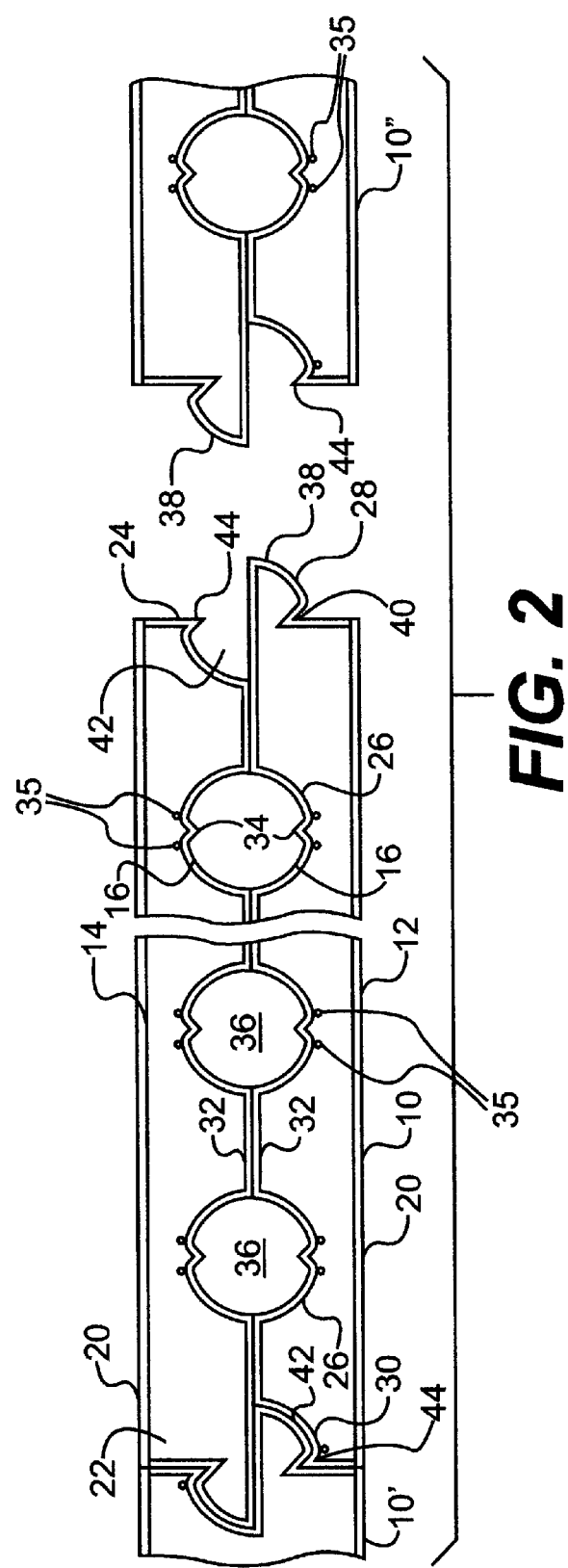
FIG. 2 is a horizontal cross-section of multiple wall panels as shown in FIG. 1 being connected.

Referring also to FIG. 2, the panel 10 is shown with one lateral end 22 connected to a second panel 10' and another opposite lateral end 24 about to be connected to a third panel 10". In this embodiment, each structural member 16 is a substantially axially rigid member comprised of a sheet of plastic that has a general corrugated shape. Each structural member 16 has a substantially uniform wall thickness with general semi-circular shaped sections 26 and snap-lock end or jamb end sections 28, 30. The general semi-circular shaped sections 26 form parallel longitudinal grooves and are interconnected by parallel longitudinal flat sections 32. In this embodiment each general semi-circular section 26 has an inwardly projecting V-shaped rib or notch section 34, wherein its apex forms a cutting guide for modular panel subdivision and its legs form an inverted compression interlock between panels when subdivided. As an option to this embodiment, steel wires or viscose polymeric reinforcing tapes 35 may be laminated and bonded to the outer face of the structural members 16 just beyond the inner gap between diverging legs of the V-shaped notched section 34. Wire or tape members 35 are thus located at the extremity of the neutral axis of the core structure with a modulus of elasticity greater than the structural member 16 to enhance the stiffness of the material to resist the tensile forces of bucking under axial load. The preferred wire size is 12 gage, but may vary according to the calculated need. Top and bottom edges of the panels expose both foam core and sheet ends, and the vertical side edges of the panels are configured out of solid plastic extensions of the corrugated sheets into a geometry that facilitates the automatic interlocking with adjacent panels, or panel elements. Further, the circular voids have an inward v-shaped crimp or notch section 34, at opposing tangent points, which doubles as a manual modular cutting guide to reduce the running width of the panels and, as a half v-shape profile, as a compression fitting for adjacent panel interlock. The panel sections 12, 14 are aligned such that the general semi-circular shaped sections 26 align to form parallel hollow tubular sections 36 between the top and bottom sides of the panel 10. As seen in FIG. 1, in a preferred embodiment the general semi-circular sections 36 have breathing vent holes 37 therethrough for venting process gases from the foam layer 18. However, the holes 37 need not be provided, such as when the panel section does not have a cover layer. Preferably, the flat sections 32 of the adjacent panel sections 12, 14 are bonded to each other by adhesive to thereby fixedly attach the panel sections to each other. However, any suitable means could be used to connect the panel sections to each other. Also, these flat sections 32 may have a vertical succession of holes, larger in diameter than the vent holes 37, which intentionally allow the foam matrices from both sides of the composite to structurally integrate, such as in a manufacturing process where the foam molding of both panel halves takes places simultaneously in the encapsulation of both sheets in a single process. In addition, the structural members 16 could have other types of cross-sectional shapes. In this embodiment the first end section 28 is a projecting male section with a curved leading end 38 and a receiving notch 40. The second end section 30 is a receiving female section with a receiving area 42 and a projecting notch 44. The receiving area 42 is sized and shaped to matingly receive the curved leading end 38 of an adjacent panel and the receiving notch 40 is sized and shaped to matingly receive the projecting notch 44 of an adjacent panel. During mating of adjacent panels the ends 28, 30 are adapted to resiliently deform to snap-lock mount the panels to each other. In alternate embodiments alternative or additions means for connecting adjacent panels to each other could be provided.

The foam layer 18 is preferably comprised of expanded polymeric beads. However, in alternate embodiments other types of foam or expanded foam layers could be provided. The foam layer 18 is formed on opposing sides of the structural layer or layers 16 as a composite lamination with an adhesive. This process is disclosed in detail in co-pending U.S. patent application Ser. No. 08/841,356 which is hereby incorporated by reference in its entirety. The composite lamination formed by the structural member 16 and the foam layer 18 form a lightweight panel section in which the structural member 16 is laterally stiffened by the foam layer 18 and, thus, can withstand an increased axial load without laterally bending or buckling outward.

In one embodiment the cover layer 20 is comprised of a heat and fire retardant substrate, with a moisture retardant drywall compatible paper attached directly to the outer surface of the substrate, and the substrate itself attached directly to the outer side of the foam layer 18 opposite from the structural member 16. In an alternate embodiment the cover layer could be a fabric wall paper covering or a separate panel or board attached to the lamination 16/18. For the drywall paper and heat & fire retardant substrate embodiment, the combined laminate could be attached to the foam layer 18 as the foam layer is being expanded on the structural member 16 or shortly thereafter. Thus, process gases from expansion of the foam layer 18 can escape through the holes 37 and out the perforated hollow tubular sections 36. The panel sections could alternatively or additionally provide a layer of an intumescent material as or on the cover layer 20. Alternatively, the layer of intumescent material could also be provided immediately beneath the surface paper membrane of the laminate 20, or between the total laminate 20 and the foam layer 18. However, an intumescent material need not be provided.

When the panel sections 12, 14 are attached to each other the hollow tubular sections 36 are provided as a general circular shape with the notches 34 forming two inwardly projecting ribs. The two structural members 16 form an inner primary structure. The two foam layers 18 form a resilient lateral structural reinforcement on opposite sides of the inner structure. The tubular sections 36 can be used as passageways to position electrical wires or other types of utilities therethrough. Additionally, the tubular sections 36 can have flexible water supply pipes extending therethrough, or be used as a substitute for air conditioning ductwork. In one preferred embodiment the distance between the opposing notches is about three inches to accommodate these functions. FIG. 2 shows how panels 10 can be connected end-to-end. Referring also to FIGS. 3–6 other types of connections are shown.

Figure 3:
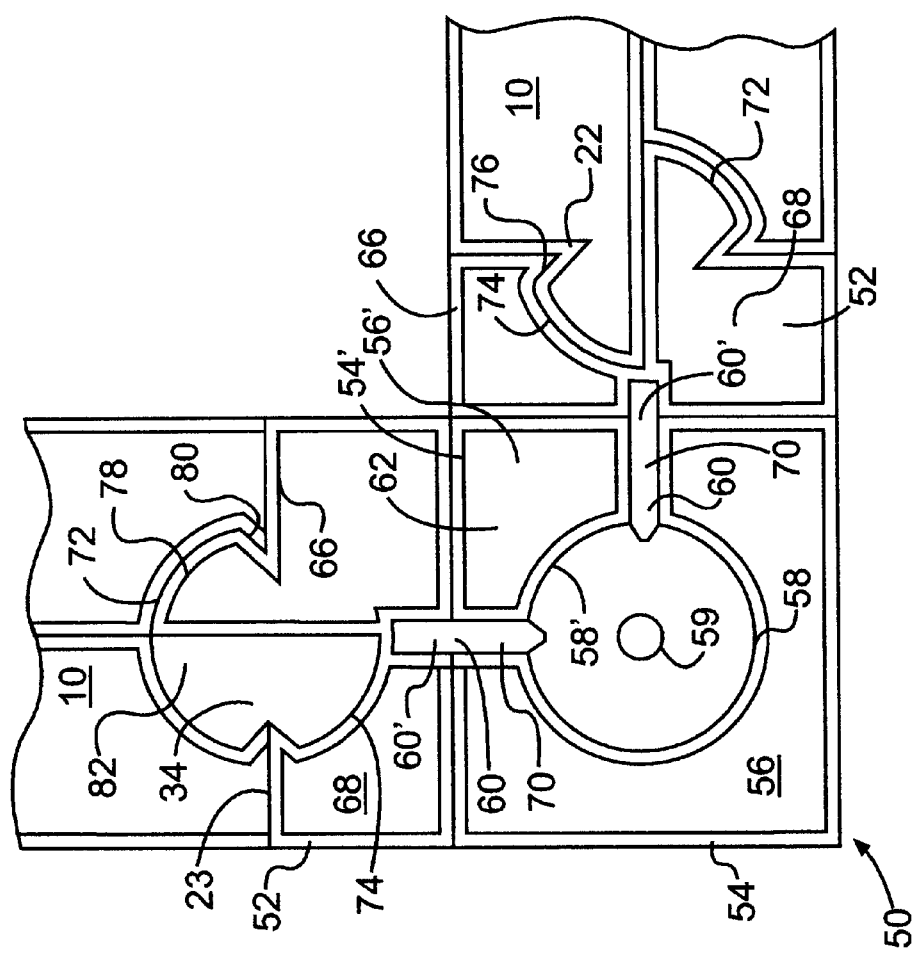
FIG. 3 is a horizontal cross-section of a 90° corner connection of two wall panels.

FIG. 3 shows a 90° corner connection between two of the panels 10. In this embodiment the connection comprises a two-piece corner member 50, with separate sections 62 and 64, and two jamb end members 52. The two jamb end members 52 are separately attached directly between the corner member 50 and respective lateral edges of panel 10. Section 64 of the corner member 50 comprises a frame piece 54 with a foam filler 56, which form three-quarters of a square shape with an inner ring section 58, and section 62 of corner member 50 comprises a frame piece 54' with an inner ring section 58' and a foam filler 56', which form the remaining one-quarter of a completed square shape for corner member 50. The frame pieces 54, 54', 58 and 58' are preferably made from rigid plastic material similar to structural member 16, and can be formed by extrusion. The foam fillers 56 and 56' are foam matrices preferably formed herein from polymeric material which is expanded by a chemical reaction that is dissimilar to the expansion process involved in the foam layer 18. The two jamb members 52 each comprise a structural frame piece 66 and foam filler 68. The frame piece 66 preferably comprises a rigid plastic material and the foam filler 68 preferably comprises polymeric foam similar to the foam fillers 56 and 56', which are expanded by chemical reaction. The frame piece 66 has a removable longitudinal connecting rib 70 on the backside of jamb end member 52, and a male/female snap-lock connection section 72 on the opposite side. The removable connecting rib 70 is sized and shaped to fit in the space 60, which is in between the two sections 62 and 64 which make up the corner member 50. The rib 70 is a removable attachment, snap-locked into place when desired and fixedly attached with adhesive. It's removable purpose is two-fold in that, especially for roof stiffening applications, the inlet void space 60' on the backside of the jamb member 52 serves as a receptacle for an aluminum, or other material, structural insert between pairs of jamb members to reinforce and enhance the span capability of wall panel configurations when used for lateral forces with associated longer spans than traditional wall heights, and the other reason is that when connecting one panel to another at 90° mid-span, this rib 70 may be independently driven into the continuous wall plane being intersected, prior to the snap-lock connection to jamb member 52. The snap-lock connection section 72 has substantially the same size and shape as the right end 24 (not shown) of a panel 10. The snap-lock connection section 72 has a female receiving area 74, a projecting notch 76, a projecting male section 78 and a receiving notch 80. As seen in the lower right-hand corner of FIG. 3, the connection section 72 is adapted to snap-lock mount to the left end 22 of a panel 10. Alternatively, as seen in the upper left-hand corner of FIG. 3, a panel 10 can be shortened by cutting across the panel at the ribs 34 to form a new left or right end 23 for the panel. The projecting male section 78 snap-lock mounts with the new end 23. A separate mating piece (not shown) could be inserted in the area 82 if desired. With this type of connection system the length of the panels can be shortened, on a repetitive module, to meet construction designs as required; at least in increments between ribs 34 along the running width of the panel. In the preferred embodiment the pairs of opposing ribs 34 are spaced about 4.8 inches apart along the length of the panel, which establishes a module for all building dimensions. Thus, the center-to-center spacing of the tubular sections 36 is preferably about 4.8 inches, which is also approximately the wall panel thickness. However, other spacing dimensions could be provided. Within the inner ring section 58, this void space created at typical building corners facilitates an opportunity for the insertion of steel tie-down cables or rods 59 connecting the uppermost portion of the wall, at the junction with and including the roof construction, with the foundation by connection to an embedded anchor bolt in the foundation with a projecting hook configuration. Intermittent turnbuckles may be situated at the junction between floors and walls on multistory buildings, where access to tightening and tensioning the cables or rods may be manually accomplished. Such tension cables or rods constitute a hold-down function for the entire building structure to resist high wind forces of, for example, a hurricane, or to resist lateral shock forces of an earthquake from toppling the building structure. In alternate embodiments alternative additional means could be provided to connect the ends of two panels at a 90° corner.

Figure 3A:
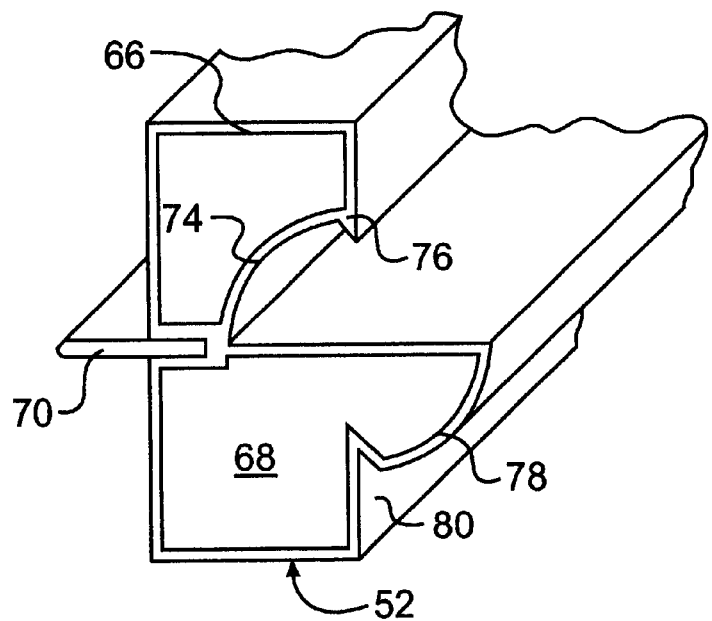
FIG. 3A is an enlarged cross-section isometric view of a typical jamb end connector.
Figure 3B:
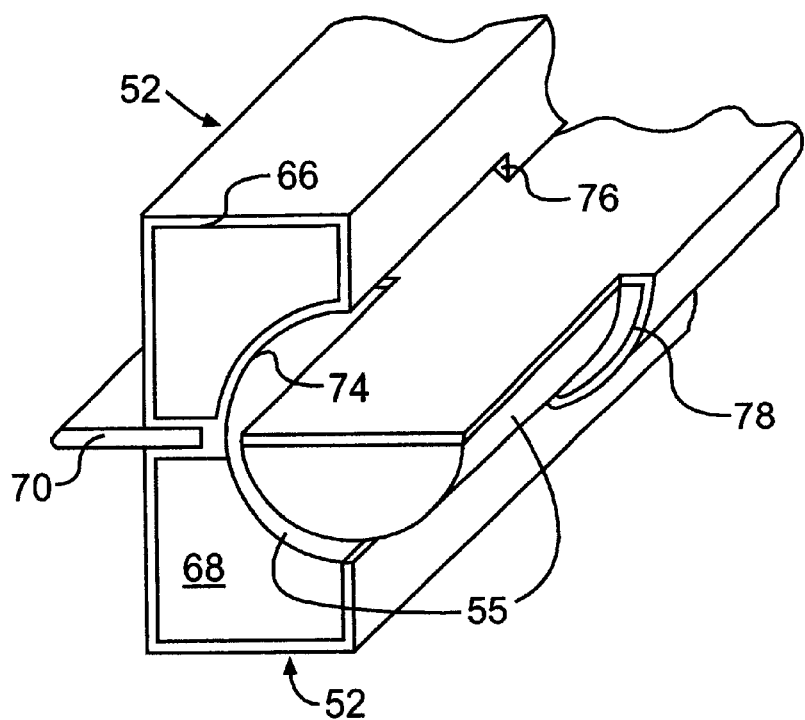
FIG. 3B is an enlarged top or bottom isometric view of a typical jamb end connector as shown in FIG. 3A.
Figure 3C:
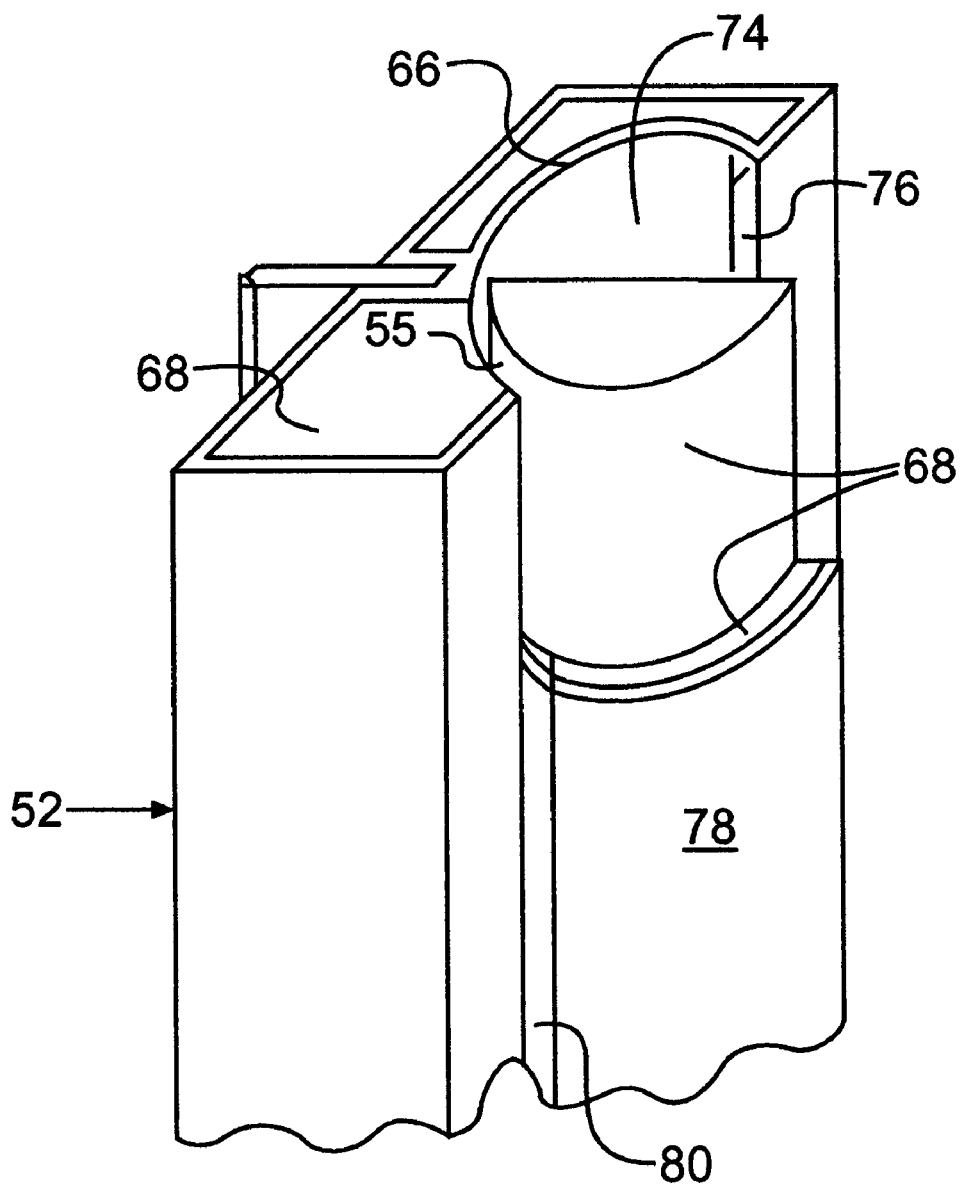
FIG. 3C is a second isometric view of FIG. 3B.

FIG. 3A is an isometric cross-section through jamb member 52, showing frame 66 and foam filler 68, the removable projecting rib 70, the projecting male section 78 and receiving notch 80, and the female receiving area 74 and projecting notch 76. FIG. 3B is similar to FIG. 3A, but rather than a cross-section is a top or bottom view of jamb member 52 showing a cylindrically rabbeted area 55 which is sized and recessed to receive a projecting dowel connector which is hollow and pipe-shaped (not shown yet). Elsewhere, the dowels on the dowel connector project into the longitudinal tubular holes 36 (not shown) in the top or bottom of the wall panels and in this condition would conflict with the ends of the projecting male section 78 and receiving notch 80, and the projecting notch 76 associated with the female receiving area 74. For purposes of clarity, FIG. 3C is another isometric view of FIG. 3B, showing the frame 66, the projecting male section 78, the female receiving area 74, and the rabbeted area 55. This rabbeted area represents the machined removal of foam filler and frame material, after an initial fabrication stage, primarily along the shaft of male section 78 and into the foam filler 68, as well as the tip of the projecting notch 76 (shown dashed herein). There is no frame material on the surface of the rabbeted area 55, but simply exposed foam filler 68. In the preferred embodiment, this rabbet must occur at the top and bottom of all jamb members 52, and the top and bottom as well as both ends of the wall and roof panels.

Figure 4:
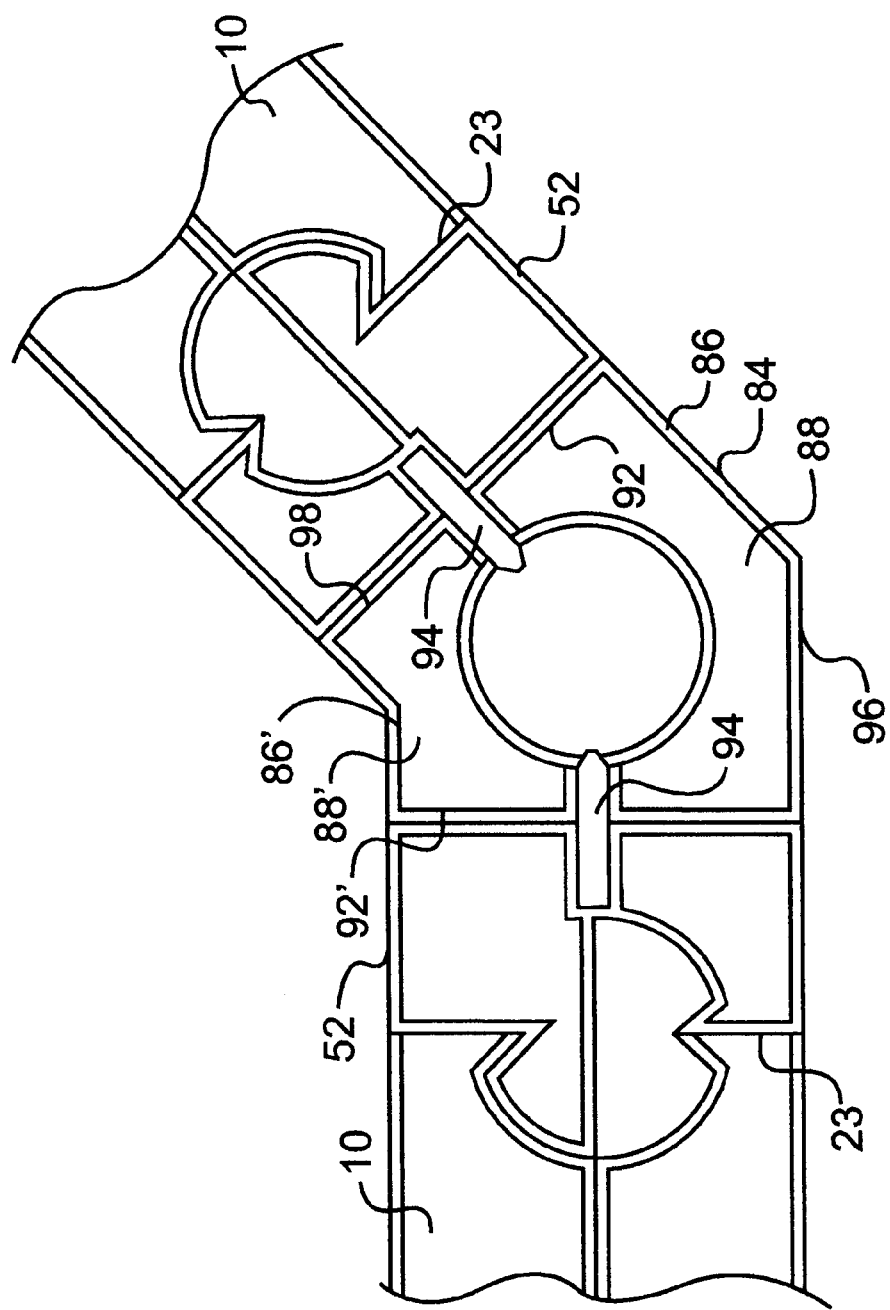
FIG. 4 is a horizontal cross-section of a 135° connection of two of the wall panels.

FIG. 4 shows a 135° corner connection between two of the panels 10. In this embodiment the connection comprises a two-piece corner member 84, with separate sections 96 and 98, and two of the jamb members 52. The outer portion of this corner connection has a frame piece 86 and a foam filler 88, and the inner portion has a frame piece 86' and a foam filler 88'. The frame pieces 86, 86', similar to the frame pieces 54, 54', are preferably comprised of substantially rigid plastic material. The frame pieces 86, 86' have an inner ring shaped section 90 and two sides 92, 92' wherein the spaces 94 between sections 96 and 98 are oriented at a 135° angle relative to each other. The jamb members 52 are attached to the sides 92 with the ribs 70 being received in the spaces 94. The modified panel ends 23 are snap-lock connected to the jamb members 52 to thereby connect the two panels 10 to each other at a 135° angle. In alternate embodiments the corner member 84 could be sized and shaped to provide an angled connection of more or less than 135° for the two panels.

Figure 5:
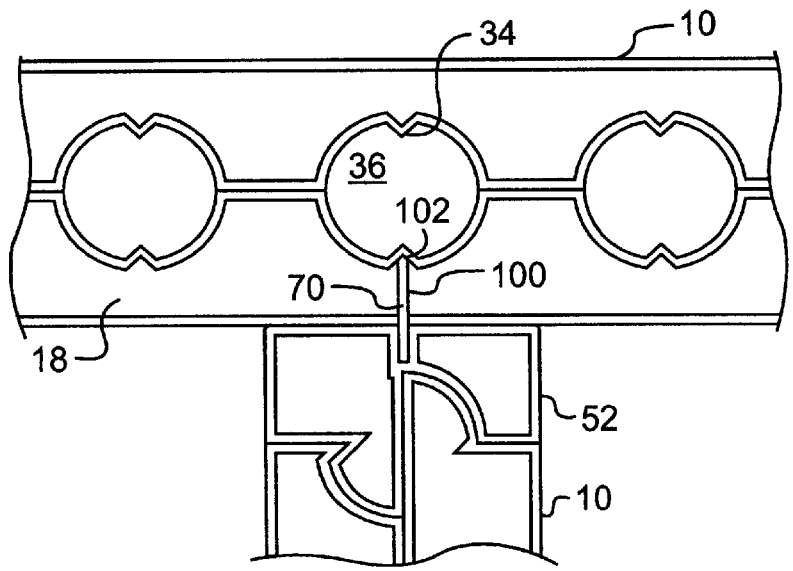
FIG. 5 is a horizontal cross-section of a 90° mid-wall intersecting connection of two of the wall panels.
Figure 6:
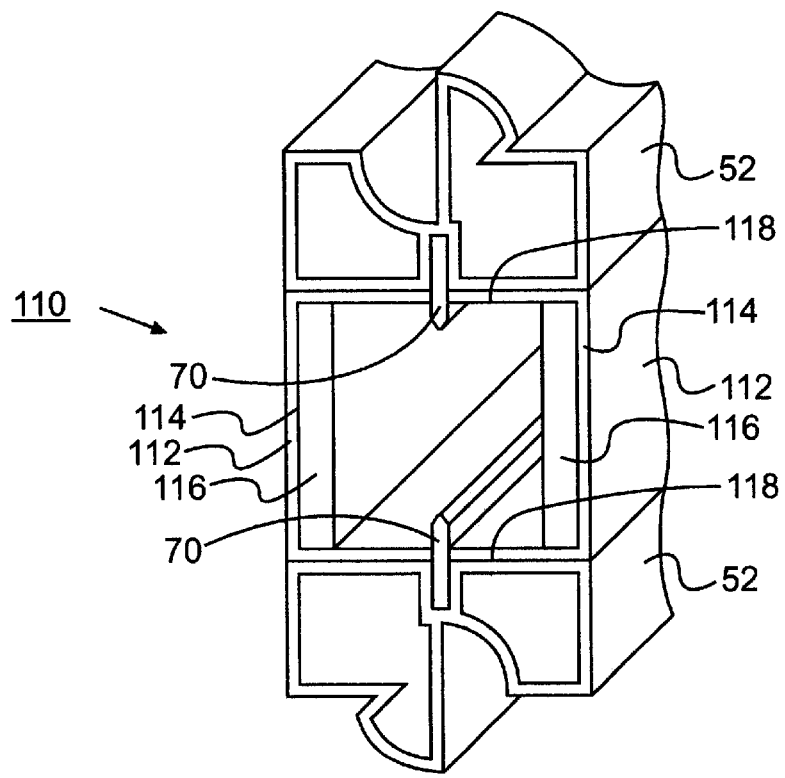
FIG. 6 is a partial perspective view of a utility chase assembly.

Referring now to FIG. 5, a 90° mid-panel connection is shown. This type of connection merely comprises a single jamb member 52 which is used to connect the two panels 10 to each other. A slotted recess 100 is cut through foam layer 18 into the lateral side of one of the panels 10 aligned with one of the ribs 34 at a centerline of a tubular section 36. The rib 70 of the jamb member 52 is positioned in the slotted recess 100 with adhesive, and pre-dimensioned of a length to facilitate the tip 102 to contact and fit outside the recessed notch created on the external side of rib 34 and be permanently bonded to it by the adhesive. In fact, it may be separated from jamb member 52 before insertion into slot 100 for accuracy and convenience, with the jamb member 52 connected and bonded with an adhesive to it after insertion. The second wall panel 10 is snap-lock connected and bonded with an adhesive to the opposite end of the same member 52. Referring now to FIG. 6 a partial perspective view of utility chase assembly 110 for use between the ends of two wall panels is shown. The assembly 110 generally comprises two of the jamb members 52 and two cross-sectional channel-shaped panel sections 112. Each panel section 112 has a channel-shaped frame piece 114 and a foam layer 116. The frame piece 114 is preferably comprised of rigid plastic material. The foam layer 116 is preferably adhered to the inside surface of the frame piece 114. The channel-shape is comprised of a web and turn-downed legs at the ends. The web height is identical with the wall panel and the width is dimensioned to any size required to facilitate miscellaneous utility pipes, wires, or the like, as long as the overall assembly 110 remains in sum total on module, which in the preferred embodiment would be a multiple of 4.8". The leg sections 118 of the frame piece 114 can be bonded or otherwise permanently attached to the jamb members 52. However the leg sections 118 could be outwardly bowed to be compression fit between the two jamb members 52 if the jamb members are already fixed to the ends of two panels. If utility chase space requirements permit, the projecting ribs 70 are fixedly attached to members 52 and provide stops for the insertion of the channel-shaped panel sections 112.

Figure 7:
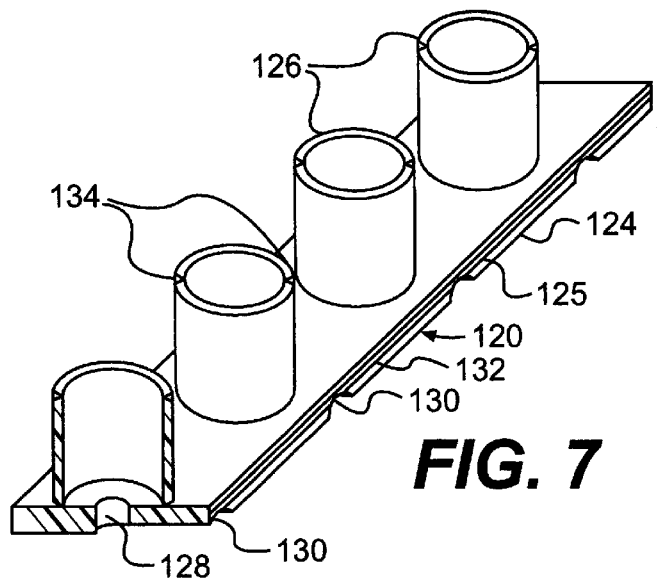
FIG. 7 is a partial perspective view with a cut away section of a wall panel and single-projected dowel connector.
Figure 8:
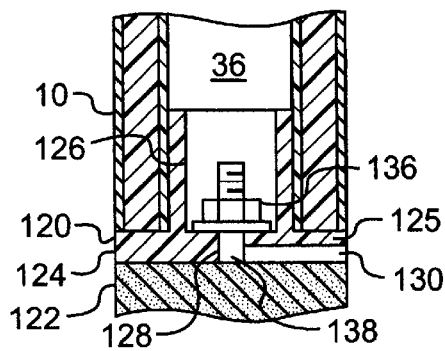
FIG. 8 is a cross-sectional view of the connector shown in FIG. 7 connecting a wall panel to a foundation.

Referring now also to FIGS. 7 and 8 portions of a single-projecting dowel connector 120 for connecting a panel 10 to a floor platform construction or foundation 122 is shown. The connector 120 is a one-piece member preferably comprised of molded plastic. The connector 120 has a board section 124 and hollow dowel sections 126 extending vertically upward from the board section 124. The board section 124 is formed with mounting holes 128 therethrough, a recessed reglet groove 125 on a lateral side face and weep channels 130 on a bottom half of the same board side. The mounting holes 128 are centrally aligned with the dowel sections 126. The weep channels 130 extend from the mounting holes 128 to a lateral side 132 of the board section 124. The reglet groove is sized and shaped to receive a snap-lock edge of a continuous pre-molded flashing component (not shown) for purposes of installing said flashing component after the initial installation of the wall system. The dowel sections 126 have notches 134 which are sized and shaped to be matingly received in the tubular sections 36 at the bottom end of the panel 10 with the ribs 34 in the notches 134. The board section 124 is attached to the foundation 122 by nuts 136 and bolts 138. The bolts pass through the mounting holes 128 into the hollow portions of the dowel sections 126. The nuts 136 are attached to the bolts 138 in the hollow portions to thereby attach the connector 120 to the foundation 122. The weep channels 130 provide a path for water to exit the tubular sections 36 if necessary.

Figure 9:
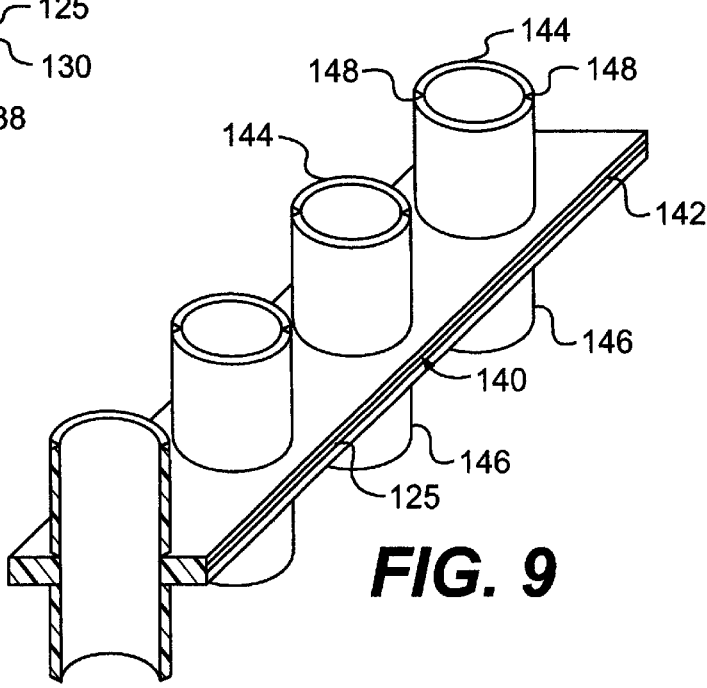
FIG. 9 is a partial perspective view with a cut away section of a double-projected dowel connector.

Referring now also to FIG. 9 there is shown a partial perspective view with a cut-away section of another connector 140 used to connect a top of one panel 10 to the bottom of another vertically orientated panel 10. The connector 140, with double-projecting dowels, used to connect a top of one wall panel 10 to the bottom of an intermediate connection device (not shown), then another connector 140 placed on top of said intermediate connection device, ultimately to be connected to the bottom of another vertically aligned wall panel 10. The connector 140 has a board section 142 and vertically extending upper and lower hollow dowel sections 144, 146. The board section 142 also has a recessed reglet groove 125 on at least one lateral side face that is sized and shaped to receive a snap-lock pre-molded flashing component after initial installation of the wall system. The exterior surfaces of the dowel sections 144, 146, have notches 148. The dowel sections 144, 146 are sized and shaped to be matingly received in the tubular sections 36 of the panels 10. The tubular sections 36 of the panels 10 are fixedly connected to the dowel sections 144, 146, such as by adhesive. Thus, the connectors 140 allow panels 10 to be vertically aligned and structurally connected. The length of connectors 140 shall exceed individual panel widths such that further structural interconnection between adjacent horizontally aligned wall panels is achieved in a running wall length similar to the function of a double top 2"×4" wood plate system associated with conventional construction.

Figure 10:
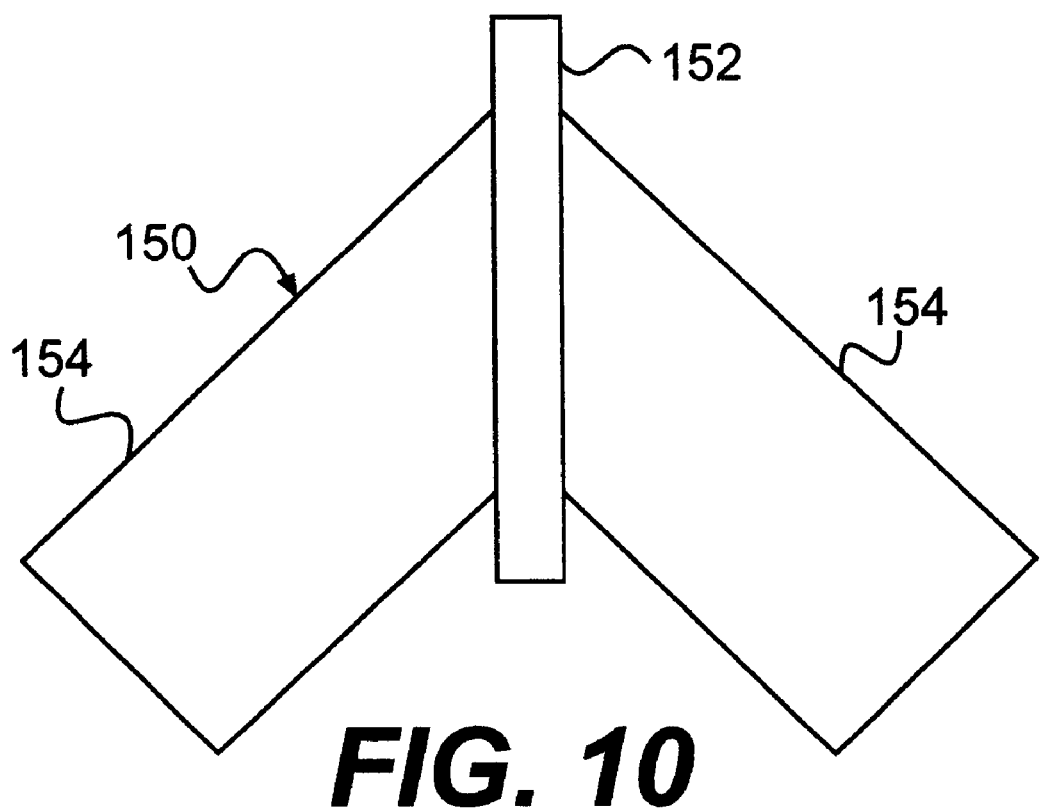
FIG. 10 is an elevational end view of a roof ridge connector for connecting multiple ones of the wall panels as shown in FIG. 1 as roof panels.

Referring also to FIG. 10, an end view of a roof ridge connector 150 is shown. The connector 150 is preferably comprised of a one-piece molded plastic member. The connector 150 has a center span 152 and dowel sections 154 extending from opposite sides of the center span 152. The dowel sections 154 on each side of the center span 152 are sized and shaped to be received in the tubular sections 36 of the panels 10. The ends of the panels 10 would preferably be cut to mate with the center span 152. The connector 150 would be a single continuous member for the entire length of the roof ridge. Initially, the roof ridge connector 150 would be first installed between end wall or column supports (not shown) and afterward fixedly attached to the panels 10 such as by adhesive connecting the dowel sections 154 to the inside of the tubular sections 36 of the panels. With this type of connector the panels 10 could be used as roof panels with the connector 150 being located at the angled peak of the roof.

Referring now also to FIG. 10A, a roof ridge connector 151 is now shown as an alternate split-configuration to the roof ridge connector 150 of FIG. 10 having two opposite symmetrical span members 153 and respective dowel sections 155 each projecting from a single side only of span members 153 and sized and shaped to fit inside of respective tubular sections 36 in panels 10. Additionally, each span member 153 has successive countersunk holes therethrough in between the projecting dowels 155 which relate to the opposite side span member 153, to facilitate the structural interconnection of said members by means of through-bolts and nuts 157. The primary purpose of the split-configuration roof ridge member 151 is to facilitate the additional insertion of a structural roof ridge member 159 between each side member, such that the overall ridge assembly may be capable of greater strength and therefore longer spans than that shown in FIG. 10, for a wide variety of roof applications and structural conditions as well as the substantial installation of the ridge assembly prior to the connection with panels 10.

Referring to FIG. 10B, a double-projected dowel connector 140 is engaged in the top of a panel 10 used in wall applications and an angular hollow dowel connector 141, with bell 141' (female) and spigot 141" (male) ends is fixedly attached at the bell end on top of connector 140 such that the spigot end penetrates a removed slot 143 in the lower half of a panel 10 used in roof applications, and is fixedly attached inside tubular sections 36 which are typical to both wall and roof panel applications. Closure piece 145 is fixedly attached at the junction between wall and roof panels to finish this connection from the interior of an enclosed building space, and finally a single-projected dowel connector 120 is mated to the end of a roof panel 10 to seal off the exposed open-ended tubular sections 36 from the weather and be capable of receiving a finish exterior fascia board or the like to ultimately provide a finished roof overhang condition.

Figure 10C:
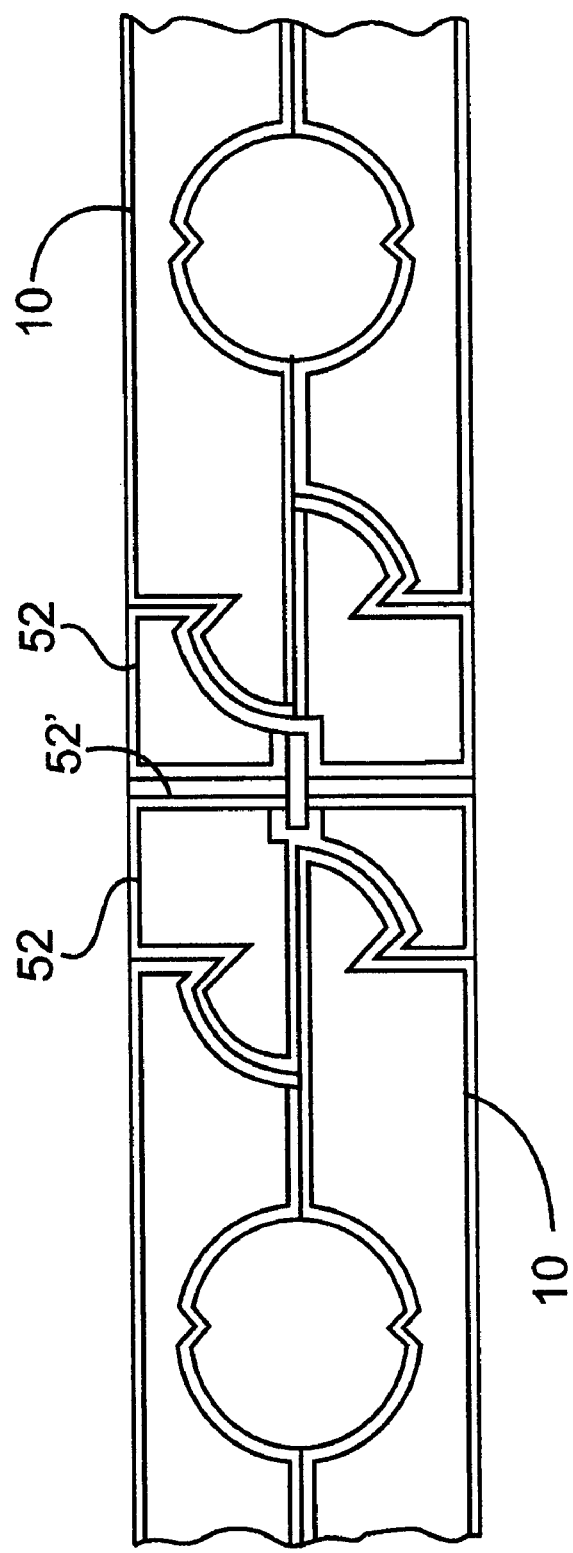
FIG. 10C is a vertical section view of the double-jamb and stiffener connection between two roof panels.

Referring now also to FIG. 10C, the jamb members 52 are also used as stiffeners in between the interconnecting lateral edges of roof panels 10, which are identical in cross section to wall panels but used herein in horizontal or oblique applications which typically require greater panel length than that normally associated with typical wall panel heights. Also, these panels 10 are subjected to lateral forces rather than axial loading, and this illustration shows junction reinforcement and additional stiffening for roof spans accomplished with the assistance of typical jamb members 52 arranged back-to-back, interconnecting two roof panels 10 with assistance of a structural spline insert 52', preferably made of extruded aluminum or any other high-strength metal or material, with the removable projecting rib 70 of the jamb member 52 now being removed to make room for the insertion of an extruded structural shape to structurally mate with jamb members 52, which themselves ultimately interconnect with the panels 10 in typical roof applications.

Figure 11:
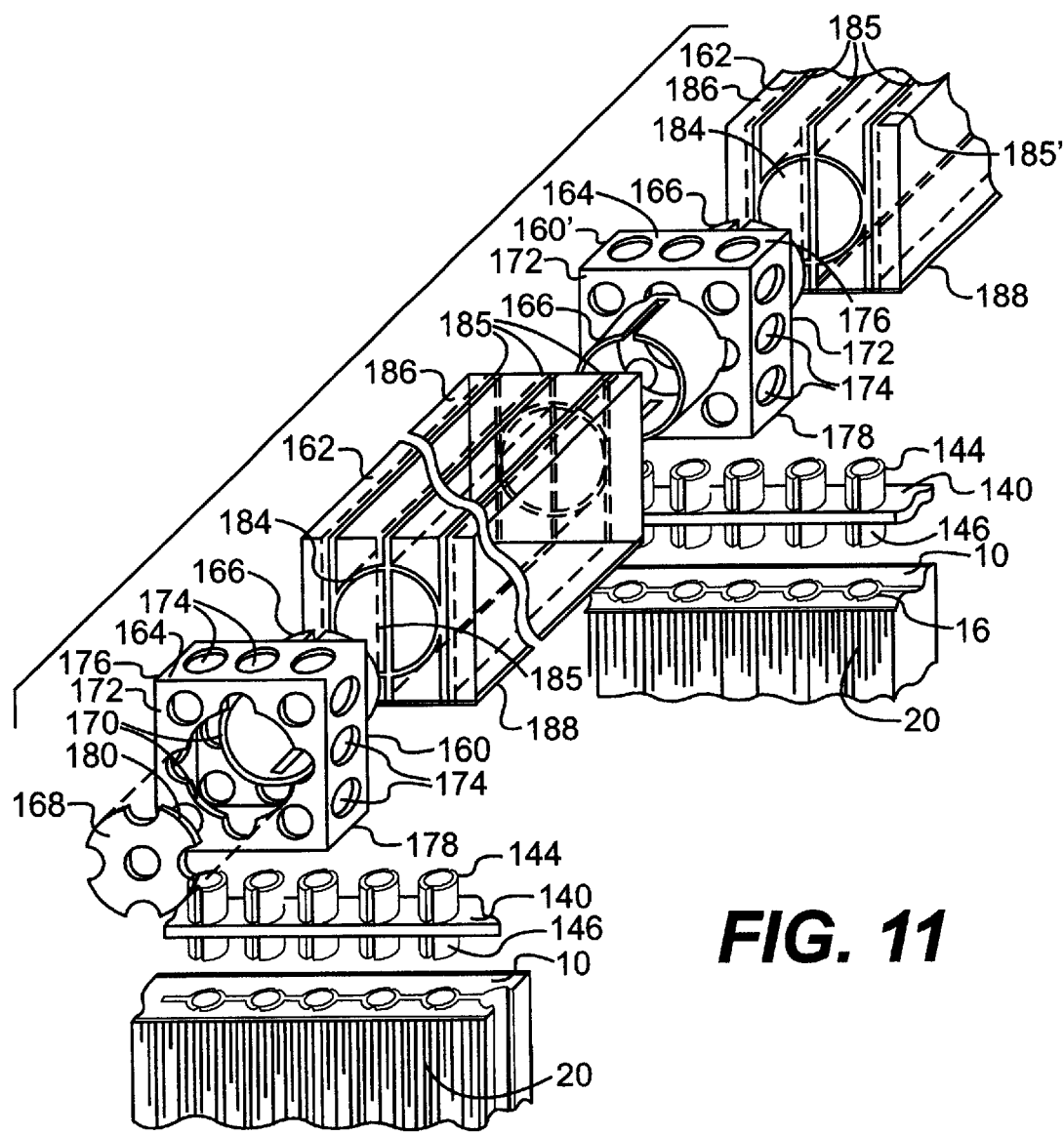
FIG. 11 is a partial exploded isometric view of floor/ceiling beams, wall panels below, plenum boxes and double-projected dowel connectors.
Figure 12:
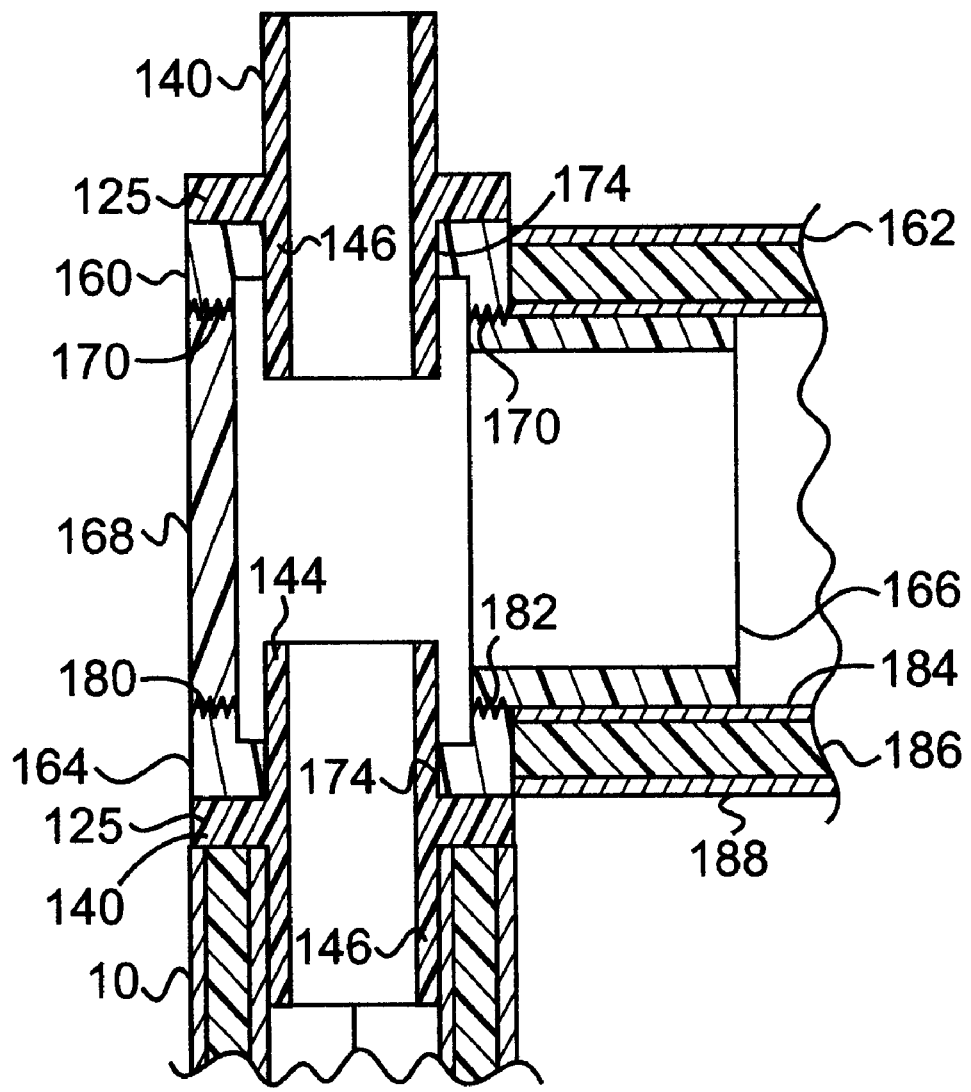
FIG. 12 is a vertical section view of a connection of a floor/ceiling beam to a wall panel, by means of a plenum box, two double-projected dowel connectors and a threaded split-pipe stub projection from the plenum box.

Referring to FIGS. 11 and 12, a floor/ceiling beam element and wall panel assembly system using features of the present invention is shown. The system generally comprises plenum junction boxes 160, floor beams 162, double-projected dowel connectors 140, and wall panels 10. The plenum junction boxes 160 comprise a box 164, at least one lateral pipe-shaped extension 166 that has vertically aligned slotted cut-outs, and an optional closure plate 168. The plenum box 160 is preferably comprised of molded plastic similar to the structural member 16. As seen in FIG. 12, each box 164 has a width about the same width as the panels 10. The box 164 has large circular openings 170 on opposite large lateral sides 172 and an array of smaller holes 174 on all surfaces including the top and bottom sides 176, 178. Preferably, the large circular openings 170 are threaded. The holes 174 are suitably sized and shaped and located on the top and bottom sides 176, 178 to receive dowel sections 144, 146 from the respective bottom and top connectors 140. In the embodiment shown, the connector 160 is used on top of the panel 10 for a first floor ceiling and second floor or attic floor, but the boxes 160 could be connected to the foundation connectors 120 for forming a first floor flooring system. The closure plate 168 has a threaded edge 180 and is threaded into one of the openings 170 to close the opening when that side is an exterior load-bearing wall, but the plenum boxes 160 are also required on the non-load bearing exterior wall (with the closure plates 168) for the installation of utilities therein. The lateral pipe-shaped extension 166 has a threaded outer end edge 182 that is screwed into one of the openings 170. Pipe-shaped extension 166 also has vertically aligned slotted cut-outs along its extended length, not including the threaded end part, for ultimate insertion into a vertically bisected hollow tubular section of a typical floor beam/ceiling element 162. For an interior wall connector 160', as seen in FIG. 11, two lateral pipe-shaped extensions 166 are provided; one from each opposite lateral side face of the box 164. In a preferred embodiment the closure plates 168 and lateral pipe-shaped and slotted extensions 166 are fixed to their plenum boxes 164, such as with an adhesive, with the slotted cut-outs vertically aligned in every connection.

The floor beams 162 each generally comprise an extruded rigid hollow tube frame 184 of a modular diameter with three continuous vertical plates 185 uniformly spaced on module such that two are located at opposing side tangent points and the third bisects the pipe-shaped frame 184 and projects above and below, and an encasement section 186. The rigid frame 184 and the continuous vertical plates 185 in this embodiment are preferably made of molded plastic, however an optional laminate of thin gage continuous steel sheets 185' may also be fixedly attached such as with an adhesive to the vertical plates 185 to add significant shear strength and stiffening to the composite beam assembly with minimal additional weight. The encasement section 186 is preferably comprised of an expanded polymer or any other structural foam matrix with similar characteristics similar to foam layer 18 in the panels 10. On the underside only of the floor beam 162 which is also the actual ceiling of an immediate space below, an exterior covering 188 is provided. The composition of this covering 188 is moisture retardant and similar to the laminate 20 on the wall panels, which is a combination of a heat and fire retardant substrate with a drywall paper outer surface. The other surfaces of the floor beam 162 are intentionally uncovered to expose the ends and edges of the pipe-shaped tube and vertical plates, for purposes of bonding these ends and edges to adjacent solid plastic components. The ends of each tube 184 are sized and shaped to matingly receive the lateral pipe-shaped and slotted extension 166 therein. The extensions 166 are preferably fixed to the tube 184, such as by an adhesive. Utility lines, such as electrical wires, flexible hot & cold water supply pipes, and air conditioning ductwork functions can thus be positioned through these tubes 184, the connectors 140, tubular sections 36, and connectors 160 between the wall panels 10 and the floor beams 162.

Figure 11A:
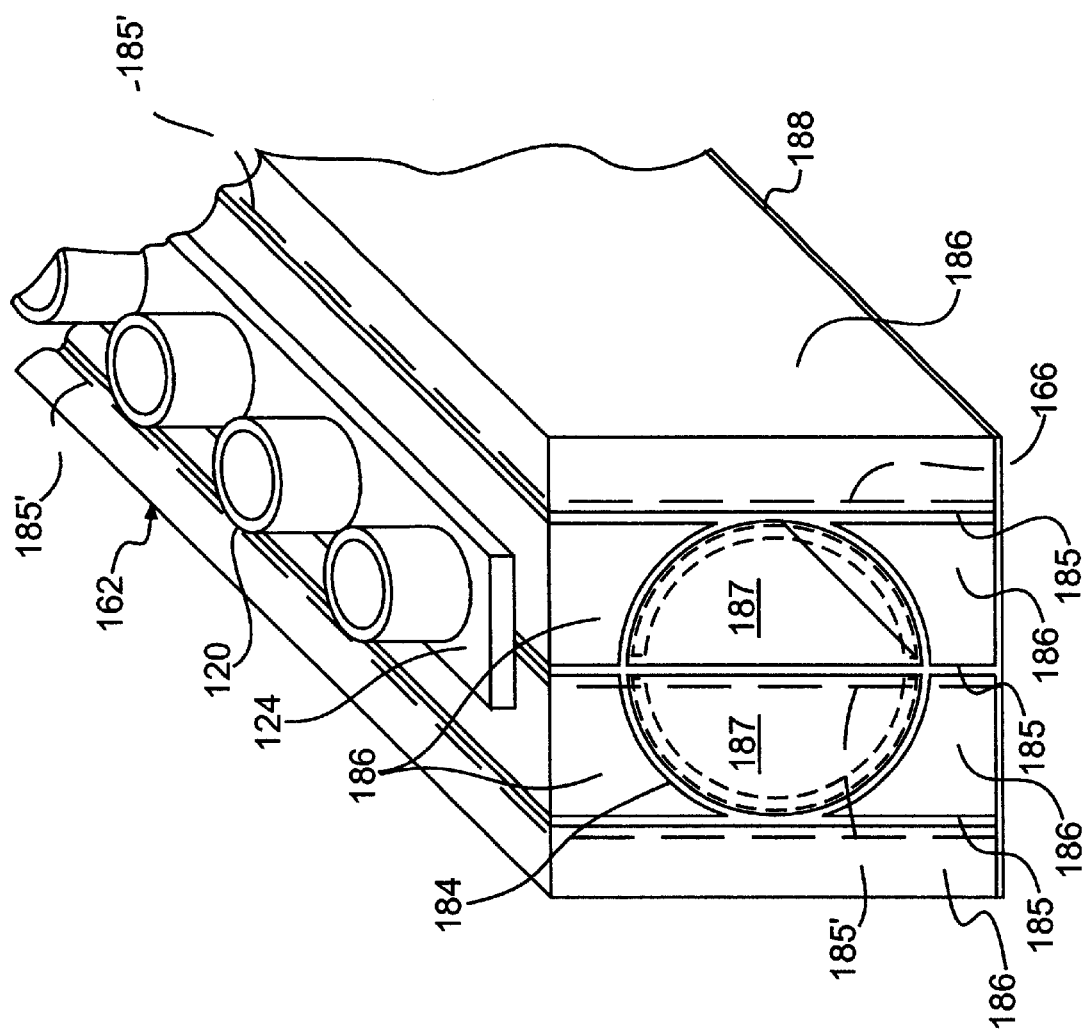
FIG. 11A is a isometric view of a typical floor beam as shown in FIG. 11, with an example of a single-projected dowel connector on top of it.

Referring now also to FIG. 11A, an enlarged isometric view of a typical floor/ceiling beam 162 is shown. The pipe-shaped tube frame 184 is exposed at each end of beam 162, showing the continuous vertical plates 185 and optional plates 185' uniformly spaced on module such that one single or laminate plate is located through the central axis of frame 184, which continually bisects it's volume into two separate sections 187, with the other two single or laminate plates 185, 185' located at opposing side tangent points of the tube-shaped frame 184. Supporting projection 166 is shown with dashed lines as it would fit into the cavity of frame 184, ceiling covering 188 is also indicated on the bottom side of the encasement section 186 which itself is comprised of six separate sections, and a single-projected dowel connector 120 is shown for example longitudinally aligned on top of the central vertical plate 185, but it could also be located on the top edge of any other vertically aligned continuous plate or be transversely oriented at 90° or any other angle. Other than the underside of typical floor beams 162, all other surfaces are a combination of exposed foam encasement sections 186 and the ends or edges or the rigid plastic plates 185 and tube frame 184. In no case will the sides or ends of the floor beams 162 ever be ultimately exposed to habitable adjacent living spaces, and the top surface will ultimately receive an external covering of conventional subflooring material. However, prior to the installation of that topside covering, transverse and longitudinal walls above may occasionally traverse this top surface. And since the foam encasement material 186 has no appreciable compressive resistance without deformation at least to some extent which negates its use for positive structural support, positive bearing support must therefore be accomplished on the edges of said continuous vertical plates 185 which are always located on building module and therefore always receptive to either longitudinal or transverse loading conditions. In the illustration thus shown, a single-projected dowel connector 120, which serves as the base connector for the eventual superposition of a forthcoming wall panel, is longitudinally and symmetrically aligned on top of the edge of a vertical plate 185. It makes no difference whether it is in the middle of the entire composite floor beam 162 or not. Not only will this condition permit positive bearing support for the wall above, whether it is load bearing itself or not, but also the junction point between plate 124 of the connector 120 and the top edge of plate 185 will be ultimately be solvent-welded such as by an adhesive to form an integral structural unit wherein the continuous vertical plate 185 acts as the web and the base plate 124 of the single-projected dowel connector acts as the top flange of the composite unit, to greatly enhance its unified structural capability to achieve long spans despite being loaded with the wall above it.

Figure 11B:
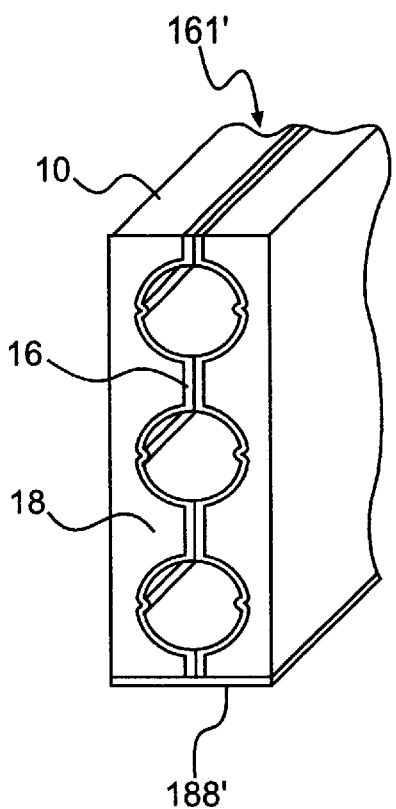
FIG. 11B is a cross-section isometric of a filler floor beam.

Referring to FIG. 11B, a typical panel 10 can also be longitudinally subdivided such that in a modular increment equal to the depth of the major typical floor beams 162, said subdivided portion of panel 10 ultimately can be used as a beam 162' to act as a fractional width interim filler floor beam between wall panels 10 above it and junctions boxes 160 and 160' in between typically shaped floor beams, to make up fractional floor space that may occur between walls if their spacing is not a multiple dimension of the typical floor beam width wherein the preferred embodiment is three modules of 4.8 inches, or 14.4 inch multiples of running room dimension. Herein, the rigid structural element 16 of the typical wall panels 10 is structurally loaded transverse rather than longitudinal, however it resistance to bending deflection under such lateral loading conditions coupled with the ability of the foam laminate 18 to laterally brace it, will allow it to function adequately against such stresses. Finally, the combined ceiling substrate 188 is applied to the filler beam's underside surface and completes it's functional installation as an integral part of a total building system.

Figure 11C:
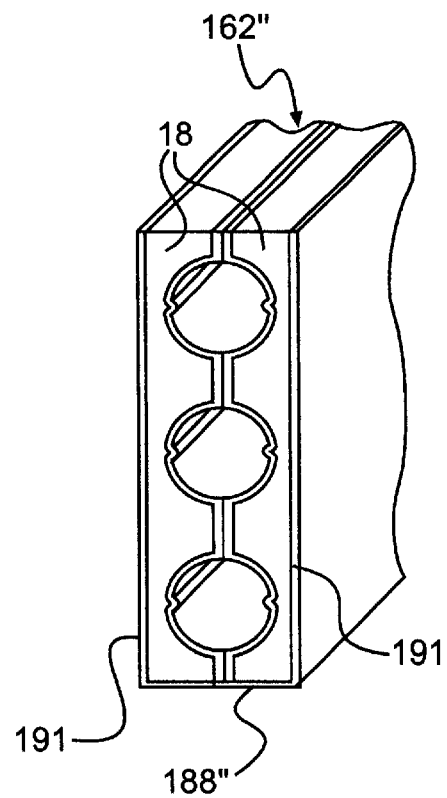
FIG. 11C is a cross-section isometric of a reinforced filler floor beam.

Now referring also to FIG. 11C, this is an isometric section of a reinforced filler floor beam 162", which is destined to carry heavier structural loading than ordinary filler floor beams 162' or perhaps even the typically shaped floor beams 162. The major difference between it and FIG. 11B is the addition of rigid plastic structural plates 191 which are laminated with an adhesive to the sides of typical foam outer laminate layer 18 and are continuous in entirety to its normal side surfaces, to assist its ability to resist failure under excessive lateral loading conditions. The only exception to it being identical to a standard filler beam configuration is that its overall width must be a modular increment exactly, which in the preferred embodiment is 4.8 inches of total composite thickness.

Figure 13:
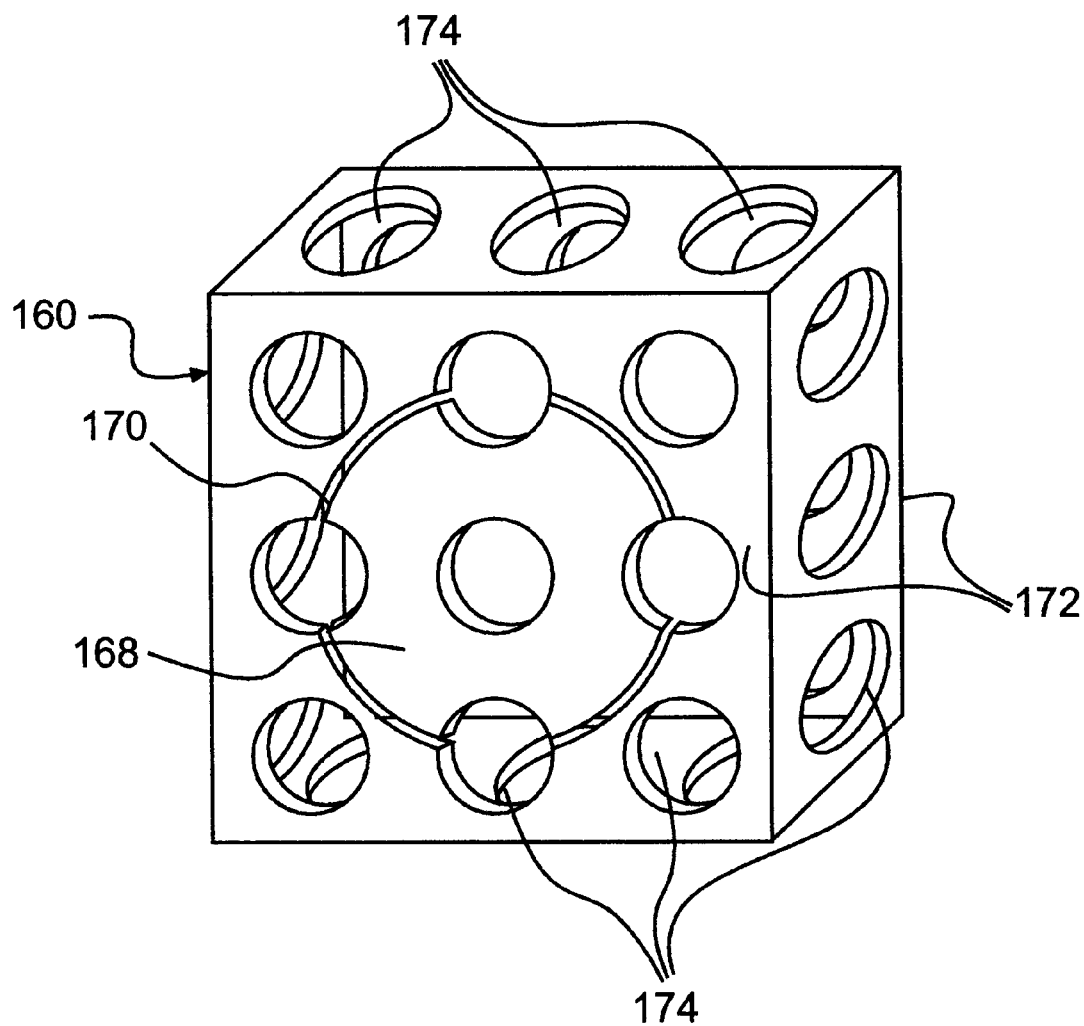
FIG. 13 is an isometric view of a typical plenum box as shown in FIG. 11.

Referring now to FIG. 13, a typical plenum junction box connector 160 is shown in an enlarged isometric view from that of FIG. 11. The box is sized and shaped to be positioned on top of a wall panel or vertically aligned between successive stories of wall panels, by means of interconnecting double-projected dowel connectors 140 (not shown) that are located immediately above and below said plenum junction boxes 160. Further, the box has a hollow cavity within for purposes of utility line transfer therein through a pattern of small holes 174 in all box surfaces and larger holes 170 on each large lateral side face 172 of the plenum box. Although all holes permit utility line pass-through, on the large lateral side faces holes 170 and 174 are also intended to receive lateral dowel-shaped extensions from the typical floor or filler beam sections (not shown) to engage them into at least the material wall thickness of the boxes 160 and become fixedly attached by adhesive, and in effect receive and support all floor beam sections. The size of these dowel-shaped lateral extensions and therefore the holes in the plenum box correspond to the inside diameter to the tubular sections 36 in the wall panels 10 or the tube-shaped frame 184 of the typical floor beam. Projections 166 occur on both side box faces 172 on interior walls where floor beams are required on both sides of the walls below, or only on one interior side of an exterior wall condition in which case a threaded closure plate 168 may be screwed into the large hole 170 to provide additional load-bearing capability for the box 160 to support load-bearing walls or roofs above it. Note that the arrangement of holes on box side faces 172 involves the superposition of both large 170 and small 174 holes, making such configured box design universal and capable of receiving either typical or filler floor beam extensions.

Figure 13A:
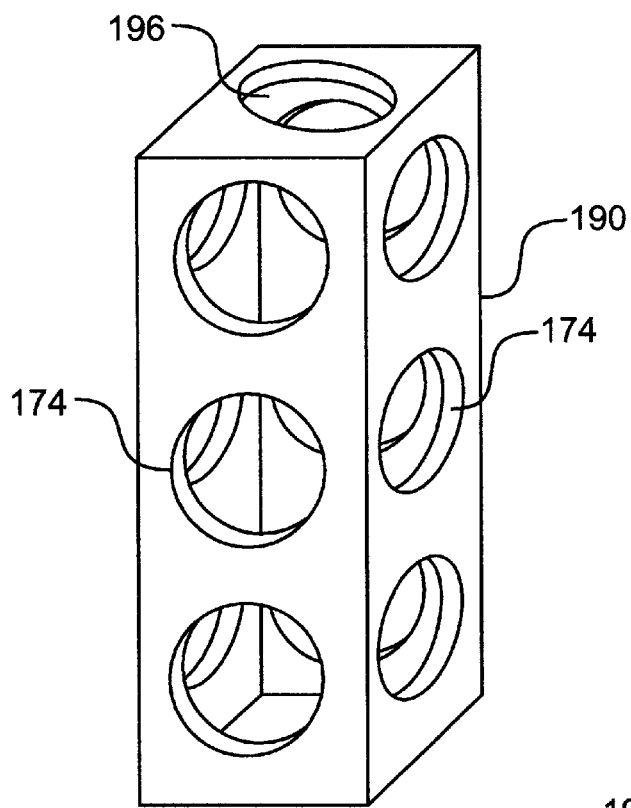
FIG. 13A is an isometric view of a filler plenum box for use with the plenum box connectors shown in FIG. 11.
Figure 13B:
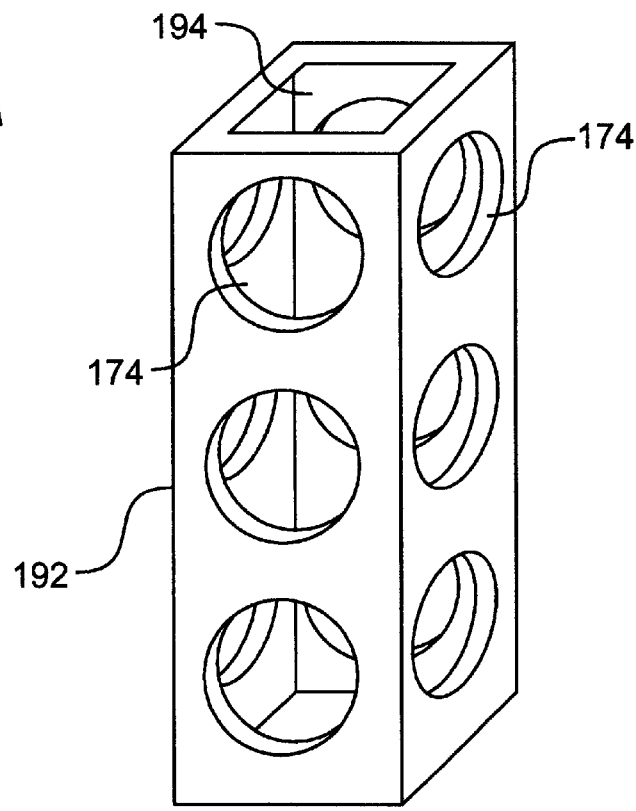
FIG. 13B is an alternate filler plenum box to that shown in FIG. 13A.

Referring also to FIG. 13A a filler junction box 190 is shown for use with the connector 160. In situations where the running width of a wall cannot be evenly capped by the connectors 160, filler boxes 190 can be used to fill a gap between connectors 160. FIG. 13B shows a filler junction box 192 with an open top and bottom for use with a utility chase such as shown in FIG. 6. The top and bottom of the box 190, on the other hand, have the dowel section receiving holes 196. The boxes 190, 192 are also preferably made of a molded plastic material. Boxes 160, 190, 192 can be laterally connected to adjacent boxes by connectors located in holes 174.

Figure 14:
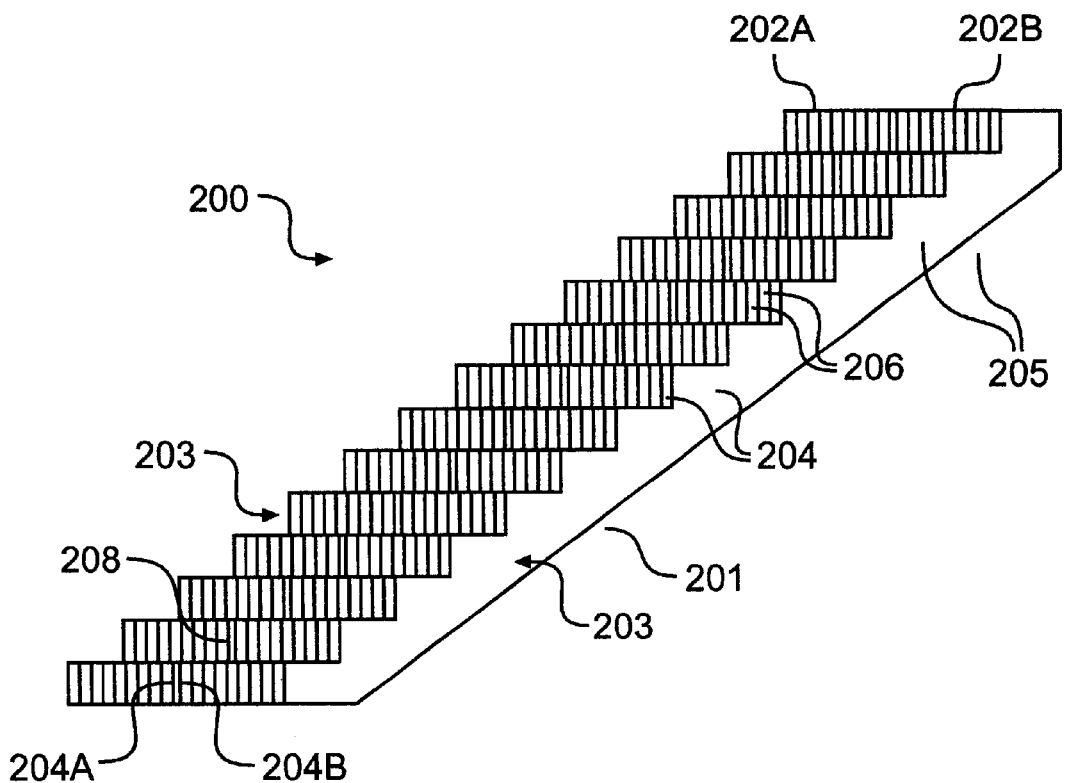
FIG. 14 is a perspective view of a stair unit incorporating features of the present invention.

Referring now to FIG. 14, a perspective view of a stair unit 200 is shown. In this embodiment the stair unit 200 is comprised of two subassemblies 202A, 202B that are fixedly connected to each other in field erection after factory fabrication. The two subassemblies 202 are identical to each other and are intended to be used in pairs in order to keep the overall individual unit weight low, or they may be fabricated as a single monolithic unit representing a completed pre-molded staircase assembly. In addition, more or less than two subassemblies could be used to form the total stair unit. Each subassembly 202 is comprised of a plurality of solid plastic sheet stair stringer profiles 204 with a structural depth which is at least six inches below the sawtooth tread/riser profile, thin gage steel bands 204' (not shown in FIG. 14, but illustrated hereinafter in FIG. 17) that are at least six inches in height and continuous along the entire run of the staircase and laminated directly to the bottom half of each stringer below the saw-tooth tread-riser profile, and expanded plastic foam layers 206. The foam layers 206 are separated and sandwiched by the solid plastic sheets 204 to form an alternating lamination. Two sheets 204A, 204B at the joint 208 between the two subassemblies 202 may be fixed to each other, such as by use of adhesive, and the finished assembly is bridged by the bridged application of ⅝" particle board tread material or any other suitable stair tread material. Pre-molded laminated foam staircases will be prefabricated to job specifications that will be standard in the system assembly of the present invention, but may vary for other uses independent of this system. The standard overall combined width must be modular to fit the assembly system of the present invention, but any specified custom width can also be accommodated. In the preferred embodiment, the standard tread/riser profile is adapted to modular floor-to-floor dimensions of the system embodied in the present invention, but can be easily adapted for construction uses completely independent of this system to fit any ordinary straight-run configuration. Further, half or proportionate floor heights can be accommodated with incremental length subdivisions of the total length straight-run stair. In the preferred embodiment, the construction is rigid composite sheets that are a combination of 0.0625" plastic and 0.0135" (29 gage) galvanized steel spaced about 3.2" inches on center and laminated to foam in between, but these dimensions can be customized. For a nominal 38.2" wide stair, total assembly weight is about 154 lb, but to suit the lightweight characteristics of the system the overall configuration will be longitudinally subdivided into two 77 lb. parts for side-by-side installation in the field, bridged by conventional ⅝" particleboard treads. The objective is to produce an entire prefabricated staircase assembly that one man can carry and install by himself. The pre-molded staircase is a compliment to the total system but also an independent product in its own right with at least twice the convenience of conventional wood frame construction because it's moisture retardant and can be installed during rough framing. The stair can be manufactured generically with great franchise potential to chain stores or local outlets for custom shaping. Mass-produced foam molded laminated straight-run staircases promise great economy, and therefore a great market potential. The only inhibitor in the past has been the non-standard floor-to-floor heights generated by custom building techniques. The present configuration assumes a technique to facilitate this customization when necessary, by fabricating said laminate composite in the factory as a laminated block composite in lengths slightly excessive of staircase lengths, and then being able to ship it to local installations for custom tread and riser profile shaping and adjustments to its finished length. Additionally, the bottom 201 and sides 203 of the staircase will have a prefinished surface 205 which is similar in composition to the wall covering 20 that is applied to the standard wall and ceiling surfaces. The outer drywall paper covering in all cases shall be moisture retardant for construction purposes when exposed to the weather.

Figure 15:
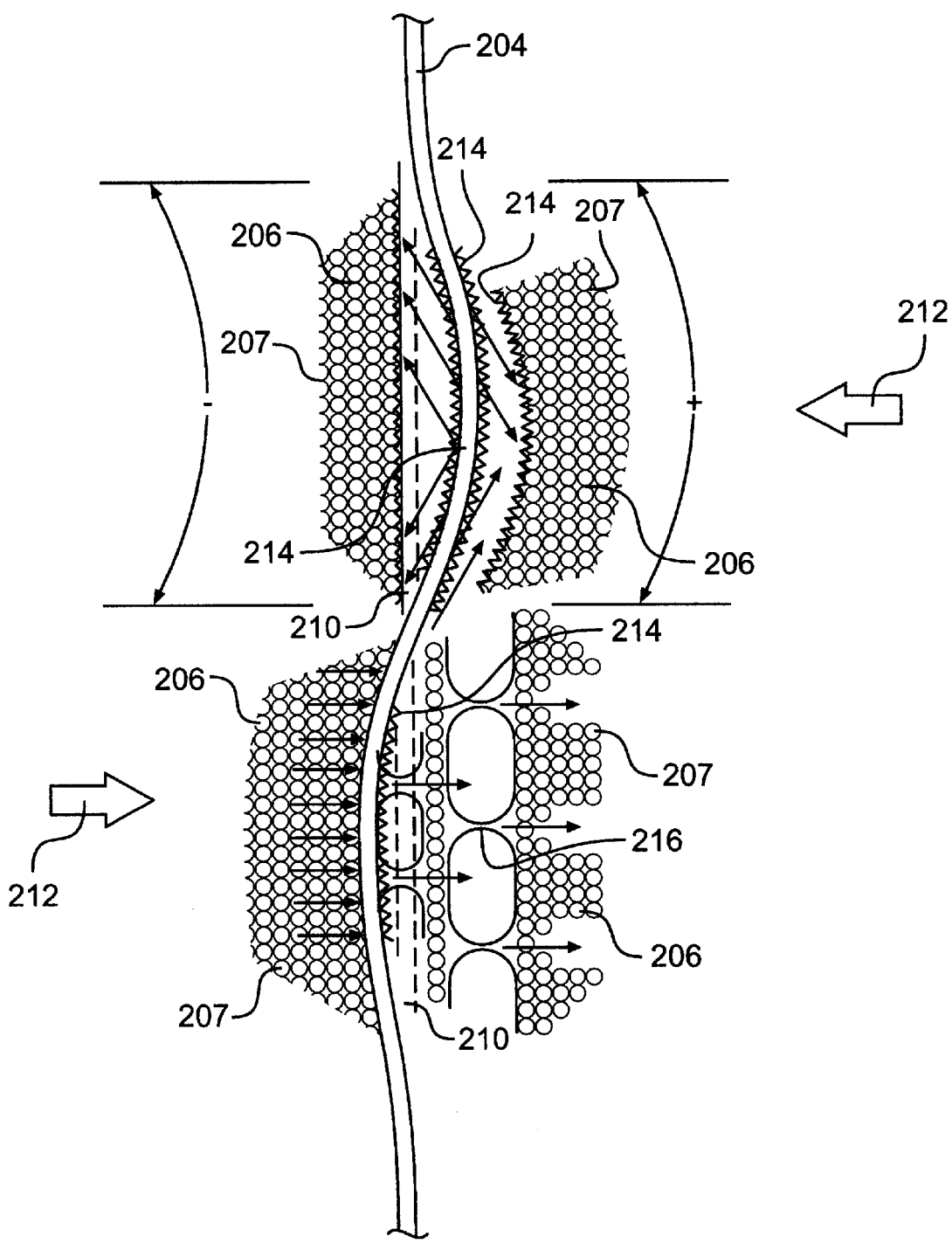
FIG. 15 is a magnified view of the laminate action between plastic foam and the stair stringers as shown in FIG. 14.

Referring to FIG. 15, a magnified close-up of the laminate action between a rigid plastic sheet stair stringer 204 and the polymer foam layer 206 is shown, and the laminate actions in this relationship typify not only the structural principles involved that make the stair work but also illustrate the typical forces and reactions involved in all laminated composite structural components of the present invention. This view shows a magnified cross-section of a solid plastic sheet stringer 204 acted on by the combined forces of the pressure of the encapsulate and the adhesion of the bead or other structural foam matrix action. Dashed lines 210 indicate the normal unloaded position of the member, and the wavy curve of stringer 204 indicates the initial tendency toward failure due to buckling when the elongate member is subjected to the force of either direct compression or accumulated distortion caused by lateral forces. Large horizontal arrows 212 indicate the reaction of the composite to restabilize the plastic sheet. In the lower portion, with the plastic sheet stringer 204 bowing left, the individual polymeric beads or other structural foam matrix 207 which were densified at molding exert compressive resistance against the inclination of the stringer to move left. On the opposite side of stringer 204, an adhesive 214 which was originally prime coated to the sheet during the molding process exhibits bead to solid or foam matrix to sheet stringer tensile force which is backed up by the tensile force 216 of molecular bead to bead adhesion, both joining to pull the solid plastic sheet stringer 204 back to the vertical position. The upper portion of this illustration is meant to show the reactive forces of shear acting to stabilize the stringer in the vertical position, with the stringer bowing to the right, the "+" and "−" signs refer to actual expanded and compacted stair stringer 204 circumference dimensions. On the left side of the stringer, within the body of the adhesive 214 itself there is a tensile resistance between the adhesive on the bead 207 and that on the stringer 204 to straighten it. Conversely, on the right side the forces within the adhesive 214 tend to resist being expanded due to the effects of the bending sheet stringer 204. In this illustration, the sheet stringer itself has inner shear forces which produce stress along its vertical axis. This diagram illustrates corresponding counter forces generated by a combination of foam matrix and adhesive to produce a lateral bracing effect which tends to stiffen the loaded member against failure. These same diagrammatic forces are at work in an axially-loaded sheet membrane by compression, and establish the basis for the structural synergy of this invention where by volume the system defined by these illustrations is approximately 88½% air. The key to this phenomenon is efficiency, wherein maximum structural performance is achieved with minimal expenditure of material, and the applications of this synergy as defined by the foregoing structural system of components is by no means limited to only these manifestations.

Figure 16:
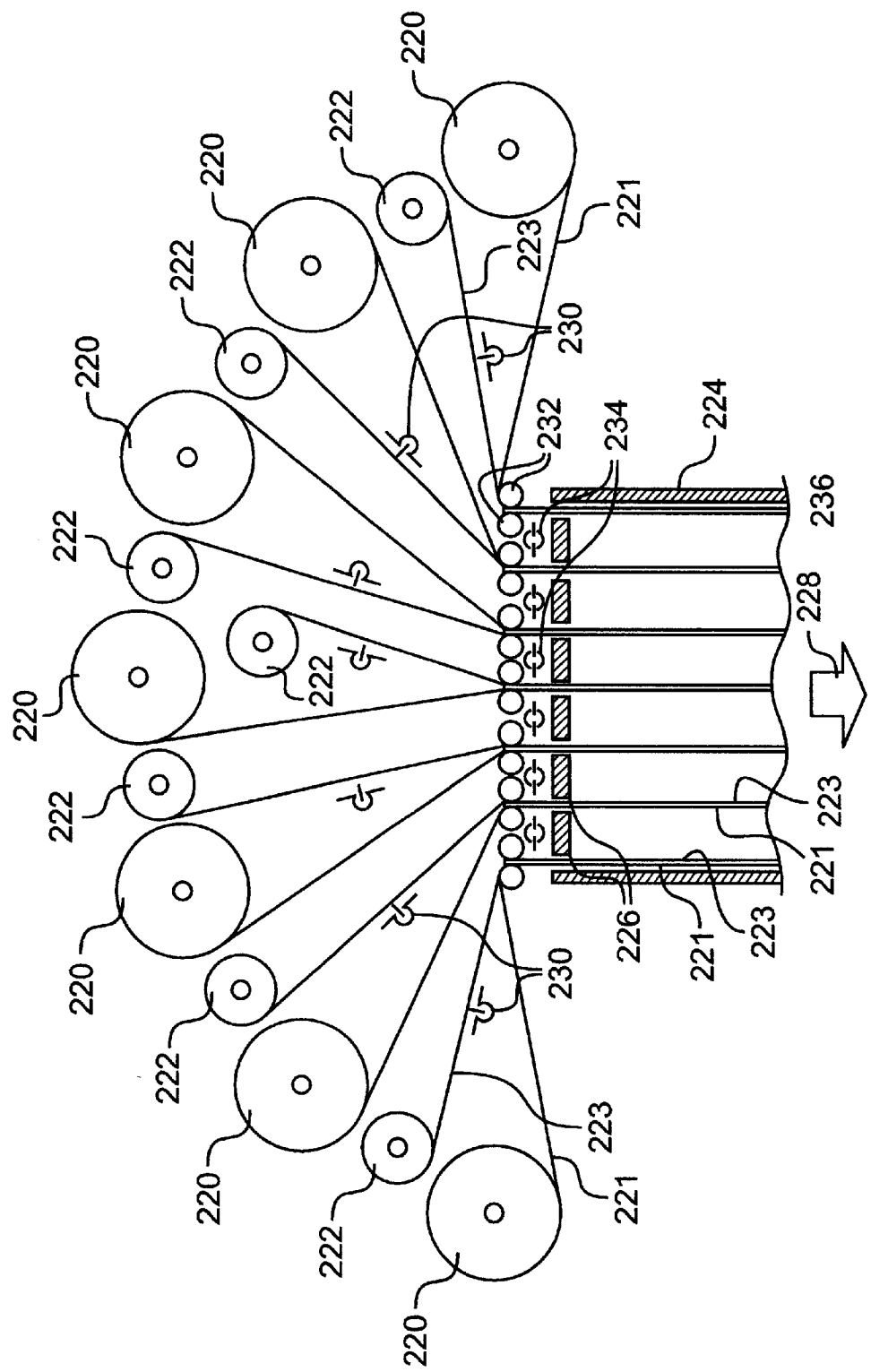
FIG. 16 is a plan view of the upstream end of an apparatus for making a premolded composite staircase showing an automatic spool feed arrangement of alternating solid plastic and thin steel material as it would feed into a mold cavity for composite integration with plastic foam.

Referring now also to FIG. 16, an automatic spool feed arrangement is shown at the upstream extremity of a molding apparatus for making a premolded composite foam staircase of FIG. 14, showing plastic sheet spools 220 and thin gage steel spools 222 in an alternating arrangement that is generally equidistant from respective points of entry into a foam mold cavity 224 through inlet slotted openings 226 in the upstream end of the mold cavity. In the preferred embodiment, the plastic sheets sheet material 221 is substantially thicker than the thin gage steel sheets 223 but both different spools will be sized to distribute the same lengths such that the plastic spools will be initially larger than the steel ones. A large arrow 228 located at the section cut of the mold cavity 224 indicates the downstream direction of processing. As the sheets are drawn downstream from the spools, the steel sheets 223 are coated on an inside face by an adhesive sprayers 230 just prior to being laminating to the plastic sheets 221. The actual point of lamination occurs as these two dissimilar sheets pass through respective pairs of rollers 232 which are motor-powered to draw in the sheets downstream and compress them together. After passing through the rollers pairs 232 and becoming laminated to each other, each composite pair of sheets is coated by a second series of adhesive sprayers 234 which prepares the composite sheets for ultimate adhesion to plastic foam inside the mold cavity during the foam molding process. Once a predetermined staircase composite length of sheet material has been drawn into the mold cavity 224, the assembly flow stops, the downstream end of the mold cavity is closed, polymeric foam material 236 is injected into the mold cavity in-between respective pairs of composite sheets, and composite fusion occurs in the molding process.

Figure 17:
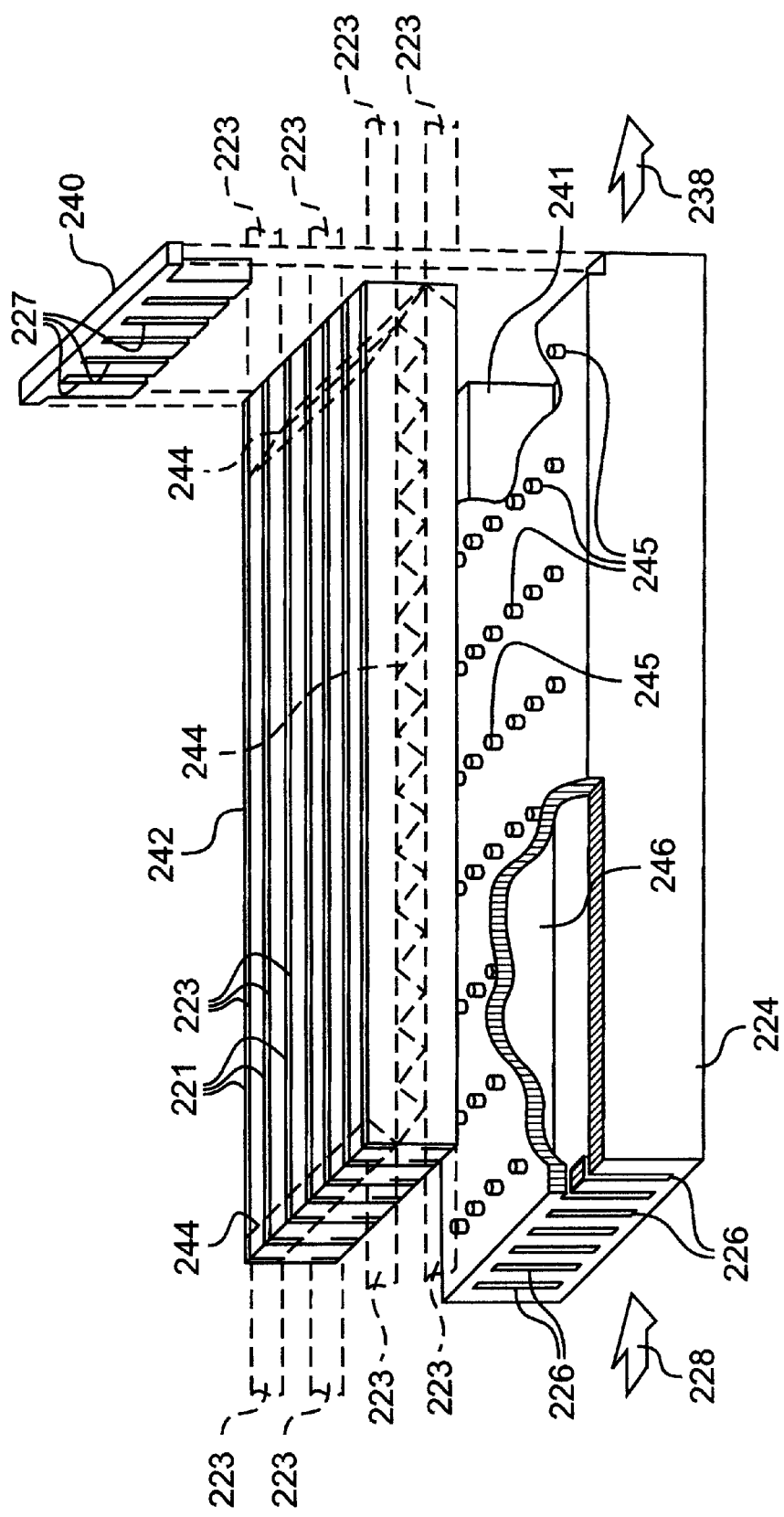
FIG. 17 is a perspective of the molding chamber for a composite premolded staircase showing basic features of the chamber along with the superimposed isometric of the composite assembly as it would appear inside the chamber.

Referring to FIG. 17 a perspective of the staircase molding chamber 224 is aligned between downstream process flow arrows 228, 238 with inlet slotted openings 226 located at the upstream end of the mold chamber and outlet slotted openings 227 located on a removable gated downstream end 240 of the foam molding chamber shown disengaged. The mold chamber 224 shown herein indicates a six-sided rectangular box shape with foam inlets 245 symmetrically placed on the broad top side such as to facilitate even distribution of pre-foam material into the chamber cavity 246. Similar provisions for vacuum and steam heat are not shown but may occur on this or other side faces of the chamber box. The strip sheet material is drawn into and through the chamber prior to molding. Then the chamber is pneumatically sealed, the foam molded composite established, and finally the composite block is removed from the downstream end of the chamber through a removable gated end opening 241. A laminated composite staircase block form 242 is diagrammatically superimposed directly above the chamber 224 to indicate the composition and arrangement of materials that occurs inside the mold chamber. As stated with reference to FIG. 14, the manufacturing technique of the preferred embodiment is to produce the pre-molded staircase first in a laminated block form sized to about one-half of a nominal stair width and then cut the saw-tooth tread/riser profile 244 with a hot wire or other cutting means (not shown) directly through the center of the laminate block, resulting in two identical half-width stair sections intended for installation side by side and optionally fixedly attached to each other such as by an adhesive. The plastic sheet material 221 is diagrammatically shown in proper position, but the ends are cut off is this drawing for purposes of clarity. In actual process, however, this material would not be severed until post molding as well as after the lamination of a heat and fire retardant surface covering downstream. By keeping the sheets 221 continuous and intact, they provide a means of moving a succession of laminate blocks down stream. Thin gage steel sections 223 are first laminated directly to the respective bottom half of each plastic stringer below the saw tooth tread/riser profile, then as a composite sheet they are drawn together into the mold cavity as shown. Note that the steel sections do not conflict with the ability of a hot wire to cut through solid and expanded plastic material sections because they are sized of a sheet width which is below and above the saw-tooth tread/riser profile 244 shown here. In the preferred embodiment, the entire laminated composite block would be generically made with slightly excessive length and depth to accommodate the widest variety of building code acceptable stair profiles. Hence, the space between steel bands 223 would be greater than the altitude of the triangle formed by a particular tread, riser and line drawn between them (i.e. hypotenuse). The purpose in these excessive dimensions is to facilitate a mass-produced generic form which satisfies economy, but later be able to customize it to fit particular demands, floor-to-floor heights, and other personal preferences. In the technique shown, such blocks can be fabricated and distributed to local sales outlets for custom shaping.

Historically, a column never approaches ultimate strength because failure always precedes it due to buckling. Columns carry loads which act parallel to the longitudinal axis and, if the applied load is eccentric, there is a lateral deflection and resultant bending stresses which combine with the direct compression and ultimately lead to failure of the member due to buckling. If the load could be applied exactly coincident with the longitudinal axis, if the member were perfectly straight, and if the material were homogeneous, then the column would be stressed in pure compression. Heretofore, it has been impossible to produce this ideal member, and columns had to be overdesigned by adding an equivalent eccentricity of load governed by the empirically formulated Slenderness Ratio L/D which is the laterally unsupported column length L divided by the diameter D. The tendency of the column to deflect laterally and develop bending stresses increases with L and decreases with D, so the taller the column and higher the L/D, the weaker the section. The shorter and smaller the L/D, the stronger the section.

The present invention maximizes the strength of a column by negating its inherent weakness, the elongation, by reducing the laterally unsupported length and thus the L/D to zero . . . by total encapsulation in and adhesion to plastic foam. This allows it to perform at the ultimate strength of its material, something only theoretical before now. Although an axially loaded column has no specific lateral load, only the threat of one, the foam tends to cancel it and remove the threat. Although it carries no direct load, the foam negates the equivalent eccentricity upset factor and facilitates the pure compression of an ideal member.

Based on this homogeneous composite, you can consider something as thin as a wire to be a load-bearing column. As an example, consider a 4"×8" plastic foam column with thousands of parallel wires encapsulated in it. Despite it being a composite, load test from a variety of different conditions could determine its strength and establish a reliable basis for using it as a functionally homogeneous structure; a scientifically predictable ideal material. Such a material has identical physical behavior at all points, and in all directions. This allows arbitrary shaping with predictable results. If a composite is hard to analyze or mathematically indeterminate, every structural use must be empirically load-tested which is expensive, time-consuming and limiting. But we can make a synthetic beam 20 feet long and calculate its increased strength for shorter spans. Having a functionally homogeneous wall means door and window cut-outs can be formed anywhere without concern for panel module or additional reinforcement, elimination of shop drawings, and complete floor plan flexibility.

A preferred method of manufacturing components of the present invention would include automation. Normal foam molding is a static, one at a time process involving the injection of beads into a container, expanding to its geometry, and removal of finished product. Initially, foam composite molding will be done by the conventional or static process, but for building-sized volumes this is slow, tedious, dimensionally inflexible and therefore a continuous foam composite molding process, similar to that outlined in copending application Ser. No. 08/841,356, will supersede the static process. The composite is an encapsulated structure bonded to foam, so it is first introduced into the mold cavity by automated means, and then molded around it. Initially, the structural material could be two-dimensional for storage and distribution from rolls, spool-fed into the mold. But its ultimate use is axial loading, and despite the fact that the foam laterally braces it, wants to be three dimensional in the mold to help resist buckling in all directions. This is done with solid plastic sheet material, first stored on rolls and then thermoformed into a corrugated shape on the way into the mold. However, an alternate method of introducing the corrugated sheet geometry into the mold cavity can be achieved by standard extrusion processes, which start with resin that is heated, made molten, and forced through dies with the desired corrugated shapes cut into it. This is the preferred method of sheet forming because extrusion attains uniform sheet thickness as opposed to thermoforming which stretches original sheet material thickness irregularly, depending on the particular geometry being formed, and thus creates deformed thicknesses in different locations across the sheet width. In the preferred embodiment, pairs of corrugated sheets form circular shapes in cross-section in combination with corresponding flat sheet areas located at the neutral axis of the overall structural load-bearing wall panel. In thermoforming, these flat areas are essentially not deformed but the semi-circular areas are stretched the most, resulting in the thinnest portions of the sheet being located where we need thickness the most to resist buckling, similar to a wide flange steel beam where the most material is at the extremities of the section. Conversely, extrusion maintains uniform thickness dictated by the dimensions of the die, so we can put the most material where we need it. This adaptability of plastic makes it highly desirable for selective use in our composite. An additional advantage is its compatibility with the foam in that we're using two forms of the same material, solid and expanded plastic, which may have the same melting point to the extent that fusion between the two could possibly occur without dependence on foreign adhesives. This quality can eliminate the need for other choices and was reinforced by discovery of impressive compression statistics found into economical grades of polystyrene. The final factor in selection of the corrugated geometry was that, in the static process, thermoformed or extruded sheets can be individually prefabricated prior to mold insertion, and thus facilitate the same cross-sectional wall panel configuration for both the static and continuous foam molding processes, and it is economically important for testing and building code approval processes to have all panel components the same regardless of the manufacturing process involved.

In one preferred embodiment of a wall panel, the panels are 48"×96"×5" thick, installed with the long axis vertical, and have a continuing series of 3" diameter longitudinal holes spaced 4.8 inches on center apart running down the panel centerline. The holes are formed by two identical corrugated sheets wherein each forms semi-circles matching the other sheet, and they are fused to each other as well as to surrounding foam in a molding process. These sheets do three things. They constitute the axial-loaded structure. The sheets are perforated at the holes to form breathing vents for the aspiration of process gases generated in the molding process. After panel erection the holes establish a continual internal chase opportunity for the installation of utilities. Because the sheets are continuous and uniform throughout the body of the composite, they also constitute a functionally homogeneous axial load-bearing structure. Top and bottom edges of the panels expose both foam core and sheet ends, and the vertical side edges of the panels are configured out of solid plastic extensions of the corrugated sheets into a geometry that facilitates the automatic interlocking with adjacent panels, or panel elements. Further, the circular voids have an inward V-shaped crimp at opposing tangent points which doubles as a manual modular cutting guide and a compression fitting for adjacent panel interlock. The broad side panel faces have a laminated paper surface that is 100% compatible with conventional drywall boards, and a heat and fire resistant substrate immediately below the paper which is laminated directly onto the surface of the foam. Furthermore, both paper and substrate are installed during the molding process, which inhibits the aspiration of process gases and necessitates the breathing vents originally formed by the perforated holes in the sheets. Panels, exclusive of laminates, weigh only 1½ lb. per square foot.

In a preferred embodiment of a roof panel, these panels are identical to the wall panels, but utilize the addition of stiffeners between panel interconnects to enhance their ability to sustain longer spans and, although their structural application here is more lateral than axially loaded, the corrugated geometry has a natural ability to resist this lateral force. The exterior surfaces of both wall and roof panels can be provided without the paper and the fire resistant substrate, and optionally accept a laminated finished surface appropriate to the differing conditions of their respective use. These exterior laminates may also be applied during the molding process, in lieu of the interior finish, and this will add significant market value to both panels. However, as a generic product, the basic panel must generate economy in its own right, independent of such treatments, because the intention is to introduce this technology without any implication that high-tech aesthetics are mandatory. By and large, it is desired to be able to produce houses that look conventional in every way, because this vastly increases market application, and will do nothing to disturb a broad-based popular acceptance of the present technology.

In a preferred embodiment of the floor beams, these members are also configured with large voids as utility plenums. Their width and height is based on the 4.8" module to mate with the wall and roof panels. The geometry is based on a circular plastic sheet pipe shape encapsulated by a square filled with foam. The most common beam size will be 14.4" square at 5 lb./per linear foot, either of prefabricated lengths or produced in truck-bed lengths for hand saw customization in the field. Filler beams, which are strategically essential to make up left over space in running room widths off the 14.4" standard floor beam module, are one constant width of 4.8" (which is the wall panel thickness without laminates) and in fact will be sections of subdivided wall panel material. Ceiling surfaces of the individual beams will receive the fire retardant laminate in the molding process, with 48" wide wall-paper style application in the field. Floor surfaces may be untreated to receive conventional particle board subflooring in the field.

In a preferred embodiment of the staircase, premolded laminated foam staircases will be prefabricated to job specifications which will be standard in the total assembly but may vary for other uses independent of the present system. The standard width is 38.4" which is a modular dimension of the present system but will satisfy conventional construction as well. The standard configuration is 10" treads and 7½" risers, but this can be customized. The construction is solid 0.0625" thick plastic sheets @ 3.2" O.C. with 6" wide 0.0135" 29 gage continuous steel bands laminated on the lower half of the stringers just below the saw tooth tread/riser profile upper edge, with the composite stringer assembly laminated to foam in between. Total assembly weight is 154 lb., but preferably will be longitudinally subdivided into two 77 lb. parts for side-by-side installation in the field, bridged by conventional ⅝" particle boards treads.

In a preferred embodiment of the connectors, there are only seven basic connectors required for the overall ultra-lite system of assembly, and limited applications can use less of them. Three of the connectors are extruded out of solid plastic, or a plasticized composite to further reduce weight and costs. Two horizontal connectors, both incorporating a continuous ¾"×5" plate on which a series of hollow pipe-shaped dowels 3" diameter at 4.8" O.C., are arranged to penetrate the wall and roof panel voids. The lower sill plate has ¾" holes on dowel centerlines, with dowels projecting 2½" upward only. The upper plate has holes corresponding to the inside diameter of the hollow dowels which project 2½" both above and below the plate. The third solid material connector is a hollow plenum box 14.4"×14.4"×5" with a ¾" shell thickness, that is designed to integrate the major horizontal and vertical elements of the system such that there is a total intercommunication between all planar surfaces of the building structure. This is critically important for the complete and uninterrupted pass through of utilities, and therefore makes the system totally integrated. The plenum boxes have holes in all surfaces which correspond to horizontal and vertical demands. A reduced-size plenum box modifies the technique to accommodate the filler beams. The other connectors are made like synthetic window frame stock filled with polyurethane foam, and establish flexible architectural transitions to complete the system of assembly. For the basic wall panel, utility installation is vertical, but horizontal room access is minimal and easily accomplished with a cordless hole-saw drill through panel faces, finished off with conventional outlet cover plates.

At a corrugated sheet cross-section area of approximately nine square inches, the particular polystyrene of the typical wall panel is rated for 10,000 psi and, at about 45 lb. for the overall composite panel weight, this equates to a theoretical potential strength to weight of up to 2000 to 1. Panels should be good for at least 1750 lb/per linear foot to carry the loads for three-story construction. Even if there is only 50% of theoretical strength after actual load testing, the following will result: 45,000 lb. total panel capacity÷4 linear feet of panel÷2.5 safety factor+4500 lb/per linear foot carrying capacity for code approval.

Although this system is truly sophisticated, it was realized that its broadest application would be achieved only if designed requiring the least skill and training possible for assembly. What has been created is like a giant set of LEGO™ blocks, where all the pieces are plenums, sophisticated to meet the needs of the building industry. And, with an understanding of the intrinsic nature of the present composite construction, and by providing the components so lightweight, one person could assemble an entire multi-story building by himself. Every component weighs less than a ½" sheet of drywall, which one person can handle, and all pieces automatically interlock with each other eliminating the need for tools. Hence, a drastic reduction in the labor cost of assembly is anticipated.

Direct savings have been determined to illustrate the product economies and advantages of this new system of construction. In order to generate accurate cost comparisons, the modular composite assembly system in the present invention has been applied to the complete design, drawings and quantification of every component in a prototypical 2050 sf single-family cathedral style house. Our profiles are industry standard, not exceptional. As per RS Means Residential Cost Data-1998, conventional components and trades we replace save approximately 7½% on a $150,000 house amounting to a significant increase in the number of qualified prospective home buyers.

The present system also provides maximum efficiency. By volume, this system is 88½% air, by which is created a structural matrix that laterally braces an axial-loaded membrane. It thus maximizes structural performance with minimum material. It also saves far more energy than conventional construction because the core material is all insulation, mass-produced, precision-fit, solvent-welded, and tighter.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A lightweight, wall panel component for a modular building, said wall panel component comprising:

an elongated membrane configured, in cross-section, as a series of flat sections and alternate hollow tubular sections interconnected in series and extending continuously from one end of the wall panel component to the other end of the wall panel component; and a structural foam bonded to, encapsulating and laterally bracing said elongated membrane, said elongated membrane, laterally braced by said structural foam forming a primary support structure operable for carrying a vertical load of a building, wherein said hollow tubular sections of the elongated membrane enhance the membrane's resistance to buckling under vertical load, said tubular sections being mutually spaced in a relationship which is approximately the thickness of the wall panel and said tubular sections being operable to become utility chases for at least one of pipes, wires, and air conditioning ductwork functions following component assembly, in the field, of a building frame.

2. A lightweight, wall panel component for a modular building, said wall panel component comprising:

an elongated membrane configured, in cross-section, as a series of flat sections and alternate hollow tubular sections interconnected in series and extending continuously from one end to the other end of said wall panel component; and a structural foam bonded to, encapsulating and laterally bracing said elongated membrane, said elongated membrane, laterally braced by said structural foam forming a primary support structure operable for carrying a vertical load of a building, wherein said hollow tubular sections of the elongated membrane enhance the membrane's resistance to buckling under vertical load and the extremities of said elongated membrane of said wall panel component top and bottom edges expose said structural foam and said elongated membrane ends including the hollow tubular sections which are operable to receive a connected series of hollow dowels to facilitate an interconnection of both vertically and horizontally aligned building components as well as pass-through of utilities after erection of panel components to form a building frame.

3. A lightweight, wall panel component for a modular building, said wall panel component having a first end and a second end, a first edge and a second edge and opposing generally flat wall surfaces, said wall panel component comprising:

an elongated membrane extending straight, and without longitudinal bending, between said first end of said wall panel component and said second end of said wall panel component and being configured, in cross-section, having at least one flat section and at least one hollow, tubular, column section, said flat section being interconnected with said hollow, tubular, column section; and a structural foam forming said opposing generally flat wall surfaces and being bonded to, encapsulating and laterally bracing said elongated membrane, said elongated membrane being laterally braced, by said structural foam and said elongated membrane forming a primary support structure operable for carrying a vertical load of a building, wherein said at least one hollow tubular section of the elongated membrane enhances the membrane's resistance to buckling under vertical load.

4. A lightweight, wall panel component as defined in claims 1 or 3, wherein:

said elongated membrane is either thermoformed or extruded and integrated into the center of said structural foam material in either a static or continuous foam molding process.

5. A lightweight, wall panel component as defined in claims 1 or 3, wherein:

a heat and fire retardant material with an outer drywall paper surface is laminated directly to sides of said structural foam.

6. A lightweight, wall panel component as defined in claim 5 and further comprising:

a layer of intumescent material adhered to the outer surface of said drywall paper.

7. A lightweight, wall panel as defined in claim 5 wherein said heat and fire retardant material comprising;

a low density glass fiberboard laminated directly to the outer surface of an expanded polymer foam core material, a drywall paper laminated to it and an intumescent paint applied on top of the paper.

8. A lightweight, wall panel as defined in claim 7 wherein:

an aluminum foil is laminated between said glass fiberboard and said intumescent paint.

9. A lightweight, wall panel as defined in claim 7 wherein:

a layer of aluminum sulfate hydrate is applied between said glass fiberboard and said intumescent paint.

10. A lightweight, wall panel as defined in claim 9 wherein:

an aluminum foil is laminated between said aluminum sulfate hydrate and said intumescent paint.

11. A lightweight, wall panel as defined in claim 5 wherein said heat and fire retardant laminate comprises:

a low density calcium silicate insulation board laminated directly to the outer surface of an expanded polymer foam core material, a drywall paper laminated to it and an intumescent paint applied on top of the paper.

12. A lightweight, wall panel as defined in claim 5 wherein said heat and fire retardant laminate covering comprises:

a low density wood fiberboard laminated directly to the outer surface of an expanded polymer foam core material, a drywall paper laminated to it and an intumescent paint applied on top of the paper.

13. A lightweight, wall panel as defined in claim 12 wherein:

an aluminum foil is laminated between said low density wood fiberboard laminated and said intumescent paint.

14. A lightweight, wall panel as defined in claim 3 wherein said heat and fire retardant laminate comprises:

a polyisobutylene/aluminum sulfate compound laminated directly to the outer surface of an expanded polymer foam core material, a first layer of intumescent paint applied directly to the surface of the ablative compound, a drywall paper laminated on top of the intumescent paint, and a second outer application of intumescent paint on top of the paper.

15. A lightweight, wall component as defined in claims 1 or 2 wherein:

said hollow tubular sections have perforations in their surface to permit the venting of gases generated in the foam molding process, and the flat sections have perforations in their surface for integration of structural foam matrices from opposing sides of the rigid structure.

16. A lightweight, wall panel component as defined in claims 1, 2 or 3 wherein:

extremities of said elongated membrane being configured on said lightweight, wall panel edges for tools-free interlock with adjacent horizontally and/or vertically aligned building components.

17. A lightweight, wall panel component as defined in claims 1, 2, or 3 wherein:

said elongated membrane comprises two separate corrugated sheets with flat and half-tubular sections that are identical and reversely oriented and bonded to each other to form a composite of at least one flat and one hollow tubular sections connected in series.

18. A lightweight, wall panel component as defined in claims 1 and 2 wherein:

the physical proportioning of all structural elements is repetitive and establishes an overall modular basis for the composite proportioning of an entire three-dimensional building assembly system.

19. A lightweight, wall panel component as defined in claims 1, 2 or 3 wherein:

each tubular section has opposing inwardly projecting v-shaped ribs located along a transverse centerline of the hollow tubular section, said transverse centerline also being a building module centerline, which provide both a manual cutting guide for the modular subdivision of lightweight, wall panels as well as the opportunity, after said subdivision, for a geometric snap-lock interconnect with other lightweight, wall panels.

20. A lightweight, wall panel component as defined in claims 1, 2 or 3 wherein:

said lightweight wall panel being operable to provide a primary building support member, wherein the elongate membrane structure is continuous throughout the entire panel dimension and constitutes a structurally homogeneous composite panel for heavy axially applied loads.

21. A lightweight, wall panel component as defined in claims 1, 2 or 3 wherein:

the extremities on the lateral side edges of the wall panel component being configured for snap-lock interconnect with adjacent lightweight, wall panels.

22. A lightweight, wall panel component as defined in claims 1, 2 or 3 wherein:

at least one of steel wires or viscose polymeric reinforcing tape is longitudinally laminated and bonded onto an outer surface of the hollow tubular section at a extremity of the neutral axis or the foam structure with a greater modulus of elasticity to enhance the stiffness of the foam structural material to resist the tensile forces of buckling under axial load.

23. A building floor system, said flooring system including at least two lightweight, wall panel components as defined in claims 1, 2, or 3 being disposed vertically to define lightweight load-bearing walls, and further comprising:

at least one composite floor beam members being fixedly attached between said two lightweight load-bearing walls, the floor beam member having at least opposing side walls and an upper flat surface composed of an expanded polymer foam with openings into opposite ends, a plurality of plenum box connectors being mounted upon the top of each lightweight load bearing wall, each said plenum box connector receiving a short pipe-shaped lateral extension which is affixed to the plenum box connector and extends into the opposite ends of the composite floor beam member and thereby to establish a structural support for the floor beam with the plenum box connectors.

24. A floor system as in claim 23 wherein the foam material is made of an expanded polymer and the rigid structure is either a solid polymeric sheet or a composite laminate of a solid polymeric sheet or sheets and a continuous thin gage steel sheet.

25. A floor system as defined in claim wherein:

the floor beam is comprised of a rigid hollow tube with continuous rigid vertically aligned plates two of which are located at opposite side external tangent points of said tube and a central one of which bisects the tube and projects above and below its perimeter, the entirety of rigid vertically aligned plates and the rigid hollow tube is encapsulated by, bonded to and laterally braced by the expanded polymeric foam with bisected hollow tubular openings exposed at opposite ends of the hollow tube and foam matrix composite to facilitate both structural connection purposes and pass-through of utilities.

26. A building floor system as defined in claim 25, wherein:

said continuous rigid vertically aligned plates are formed of a composite lamination of solid polymeric sheet and thin gage steel material such that the opposing lateral plates have the thin steel sheets laminated to their outside faces for direct bonding to the outer lateral foam layers and the central bisecting plate is comprised of a thin steel central sheet with solid polymer sheets faces laminated directly to it on both side faces.

27. A building floor system as defined in claim 25, wherein the plenum box connectors each comprises:

a hollow six-sided box with modular proportional dimensions of 3×3×1, the box having four single modular side walls defining the effective planar box thickness with a series of wall-section tubular sized holes formed thereon, said holes having substantially same diameters and spacings with the hollow tubular section of the wall panels and being adapted to receive hollow dowel projections there through for interconnecting the box to the lightweight wall panel, the box having opposing large 3×3 lateral side faces each having a larger floor beam tubular-sized hole, corresponding to the diameter of the rigid hollow tube of the floor beam, that is centrally located with threaded edges to receive the short pipe-shaped lateral extension for support of the floor beam on the plenum box, said extension with threaded outerside edges on one end to screw into the larger hole of the plenum box and vertically aligned slotted cut-outs on opposite end of sufficient width and depth to penetrate the rigid hollow tube of the floor beam and pass-by the rigid centrally vertically aligned plate which bisects the rigid hollow tube, and the larger 3×3 lateral box side faces also having a superimposed pattern of nine wall sized holes that are adapted to correspond to the hollow tubular sections of the floor beam such that the hollow plenum box is universal to the floor system and can thus accommodate both floor beams with a 3×3 cross section or with a 1×3 cross section.

28. A building floor system as defined in claim 23 and further comprising:

an interim horizontal connector having a board section and a spaced series of hollow dowels projecting above and below the board section with voids in the board section corresponding to the inside diameter of the hollow dowels, and being sized and shaped for double insertion into vertically aligned wall and plenum box holes and fixedly attached to each other to establish a permanent structural interconnection, said voids in the board section of the horizontal connector as well as the hollow portion of the projecting dowels above and below facilitating vertical pass-through of utilities after permanent interconnection therebetween.

29. A building floor system as defined in claim 28 wherein:

said hollow plenum box connector also can be permanently interconnected with the rigid hollow tube structure of the floor beam to facilitate horizontal pass-through of utilities after permanent interconnection therebetween.

30. A floor system as defined in claim 23 wherein:

said plenum box connectors include threaded pipe extensions at supporting junctions with floor members, which on interior bearing walls is on both opposing lateral side facets, and on exterior walls is on one threaded pipe extension facing the interior for floor beam interconnection.

31. A lightweight, wall panel component as defined in claim 3 wherein said elongated membrane comprises:

a solid polymer configured longitudinally as a corrugated series of flat sections and hollow tubular sections, and said structural foam is an expanded polymer.

* * * * *